(12) United States Patent
Kim et al.

(10) Patent No.: US 10,778,071 B2
(45) Date of Patent: Sep. 15, 2020

(54) STACKING-TYPE STATOR USING MULTI-LAYERED SUBSTRATE, AND IN-CAR SENSOR USING SAME

(71) Applicant: AMOTECH CO., LTD., Incheon (KR)

(72) Inventors: Byung Soo Kim, Anyang-si (KR); Jin Gwan Kim, Chuncheon-si (KR); Hong Geun Lee, Jincheon-gun (KR)

(73) Assignee: AMOTECH CO., LTD., Incheon (KR)

( * ) Notice: Subject to any disclaimer, the term of this patent is extended or adjusted under 35 U.S.C. 154(b) by 33 days.

(21) Appl. No.: 16/345,004

(22) PCT Filed: Oct. 25, 2017

(86) PCT No.: PCT/KR2017/011842
§ 371 (c)(1),
(2) Date: Apr. 25, 2019

(87) PCT Pub. No.: WO2018/080164
PCT Pub. Date: May 3, 2018

(65) Prior Publication Data
US 2019/0273422 A1    Sep. 5, 2019

(30) Foreign Application Priority Data

Oct. 26, 2016  (KR) .................. 10-2016-0140112
Dec. 22, 2016  (KR) .................. 10-2016-0176586

(51) Int. Cl.
*H02K 11/25*    (2016.01)
*H02K 11/215*   (2016.01)
(Continued)

(52) U.S. Cl.
CPC .......... *H02K 11/215* (2016.01); *H01F 27/28* (2013.01); *H02K 3/26* (2013.01); *H02K 3/46* (2013.01); *H02K 3/50* (2013.01); *H02K 7/14* (2013.01); *H02K 11/25* (2016.01); *H02K 21/24* (2013.01); *H02K 2203/03* (2013.01); *H02K 2211/03* (2013.01)

(58) Field of Classification Search
CPC ........ H02K 11/215; H02K 11/25; H02K 3/26; H02K 2203/03; H01F 27/28;
(Continued)

(56) References Cited

U.S. PATENT DOCUMENTS

| 3,096,455 A | * | 7/1963 | Hahn | .............. | H02K 23/54 |
| | | | | | 310/268 |
| 3,569,753 A | * | 3/1971 | Babikyan | .......... | H02K 29/12 |
| | | | | | 310/68 R |

(Continued)

FOREIGN PATENT DOCUMENTS

| JP | 09191623 | 7/1997 |
| JP | 3189348 | 3/2014 |

(Continued)

OTHER PUBLICATIONS

International Search Report—PCT/KR2017/011842 dated Feb. 1, 2018.

*Primary Examiner* — Terrance L Kenerly
(74) *Attorney, Agent, or Firm* — Cantor Colburn LLP

(57) ABSTRACT

Provided is a stacking-type stator including: a multi-layered substrate; coil patterns formed in a helical shape to form a plurality of turns on respective substrates of the multi-layered substrate and interconnected through conductive throughholes; a Hall sensor disposed in the multi-layered substrate and disposed at a position deviated from an interface of a magnetic pole of a rotor; and a dead point prevention yoke for setting the position of the rotor such that the Hall sensor is positioned at a position deviated from the interface of the magnetic pole of the rotor. The helical shape coil patterns include: radial direction pattern portions each disposed along a radial direction to generate a torque to rotate the rotor; and inner and outer connection pattern portions that interconnect the radial direction pattern portions and the coil patterns form a stator coil for a single phase motor.

20 Claims, 21 Drawing Sheets

(51) Int. Cl.
*H02K 3/46* (2006.01)
*H02K 21/24* (2006.01)
*H02K 3/50* (2006.01)
*H02K 7/14* (2006.01)
*H02K 3/26* (2006.01)
*H01F 27/28* (2006.01)

(58) Field of Classification Search
CPC ......... H01F 27/2804; H01F 2027/2809; H01F 2027/2814
USPC ......................................................... 310/254
See application file for complete search history.

(56) References Cited

U.S. PATENT DOCUMENTS

| | | | | |
|---|---|---|---|---|
| 4,803,425 A | * | 2/1989 | Swanberg | G01P 3/487 324/173 |
| 8,932,443 B2 | * | 1/2015 | Sto. Domingo | C25D 17/001 204/297.05 |
| 9,083,208 B2 | * | 7/2015 | Beyaz | H02K 21/24 |
| 9,464,362 B2 | * | 10/2016 | Scanlan | H01L 21/68721 |
| 9,800,109 B2 | * | 10/2017 | Shaw | H02K 9/22 |
| 2008/0231131 A1 | * | 9/2008 | Gabrys | H02K 21/24 310/114 |
| 2010/0141058 A1 | * | 6/2010 | Kim | H02K 11/25 310/43 |
| 2012/0256422 A1 | * | 10/2012 | Fradella | H02K 1/2793 290/55 |

FOREIGN PATENT DOCUMENTS

| | | |
|---|---|---|
| KR | 20080092024 | 10/2008 |
| KR | 200470057 | 11/2013 |
| KR | 20140147976 | 12/2014 |
| KR | 101491051 | 2/2015 |

* cited by examiner

FIRST PCB LAYER

FOURTH PCB LAYER

STACKING-TYPE STATOR USING MULTI-LAYERED SUBSTRATE, AND IN-CAR SENSOR USING SAME

TECHNICAL FIELD

The present disclosure relates to a stacking-type stator using a multi-layered printed circuit board (PCB) in which torque generation can be maximized in an opposite rotor, and an in-car sensor using the same.

BACKGROUND ART

Generally, automobiles or vehicles each have an air conditioner for indoor heating or cooling.

In order to improve the convenience of drivers, an automobile air conditioner is being converted into an automation device, and an in-car sensor for automatically measuring the automobile room temperature is essentially included in the air conditioner.

The in-car sensor is installed on the back surface of a grill or an instrument panel of an automobile. The in-car sensor sucks indoor air of the automobile through an aspirator system or a ventilation system, and discharges the sucked air to the outside of the automobile or the inside of the automobile, to thus allow a temperature sensor installed in the air flow to detect the temperature of the automobile indoor air.

Here, the in-car sensor of the aspirator system uses an aspiration motor in which an impeller is integrally formed on a rotor to inhale the automobile indoor air to measure the indoor air temperature of the automobile.

BLDC motors are synchronous motors with fast dynamic response, low rotor inertia and easy speed control.

A brushless direct current (BLDC) motor having a simple structure and good controllability for air conditioning with an air conditioner is used as the aspiration motor, and the structure of the aspiration motor adopts a disk type BLDC motor of an axial gap structure having a gap in the axial direction for thinning.

Meanwhile, the aspiration motor adopts a single-phase motor having a single coil, which is reduced in size and is used in consideration of cost burden. In a single-phase motor, a single stator coil is wound in a coreless/bobbinless type of quadrangular or triangular shape and mounted on a PCB (printed circuit board).

The torque (that is, rotation moment) that rotates the rotor in this single-phase motor is expressed as the product of the force vectors generated in a conductor wire through which current flows in a magnetic field and the distance vectors between the centers of rotation and the points of action of force.

Therefore, in the conventional triangular-shaped stator coil, since the total area of the linear portion of the stator coil (winding) excluding the vertex portion of the stator coil (winding) and the portion where the magnet faces is small when the rotor rotates, there is a problem that the torque for rotating the rotor is small.

In addition, such a single-phase motor is wound with a single stator coil wound in a quadrangular or triangular coreless/bobbinless type and is bonded and used on a PCB with an adhesive. Accordingly, it is difficult to manufacture such a single-phase motor at low cost, and such a single-phase motor may cause poor assembly to occur, and may have a thick film structure.

Korean Patent Registration Publication No. 10-1491051 (Patent Document 1) discloses a structure in which a bobbin is integrally formed in a bearing holder and a coil is wound on the bobbin, in order to improve a process of attaching a coil wound in a coreless/bobbinless type to a PCB (printed circuit board). However, the structure of Patent Document 1 is a thick film structure, the productivity of the coil winding is low, and a separate control PCB is required to have a motor drive circuit.

Meanwhile, in a conventional brushless direct current (BLDC) motor as a single-phase motor, a Hall sensor for detecting the magnetic pole of the rotor and generating a switching signal of the driving current for the stator coil is required. Since the Hall sensor is inexpensive, a driving circuit using only a Hall sensor is used.

In the case that a single Hall sensor is used, the magnetic pole of the Hall sensor is not detected when the Hall sensor is located at the interface of the rotor magnetic pole, and thus the current cannot be supplied to the stator coil. Therefore, there is a dead point at which the self-starting cannot be performed.

In such a single Hall sensor system, as a self-starting scheme, there are a method in which auxiliary magnets are used in the stator so that the Hall sensor deviates from a magnetic pole interface (that is, a neutral point) of a rotor, a method of installing a magnetic material screw on a coil laying portion, and a method of using a specially designed shape of a stator yoke.

In the case of using the above-mentioned Hall sensor, there is a factor of cost increase which requires additional parts to be installed for the self-starting simultaneously with the use of the expensive Hall sensor. Therefore, a method of generating the rotor position detection signal while minimizing the cost increase factor without using the Hall sensor and various sensorless motor drive methods for detecting the rotor position detection signal without using a Hall sensor have been proposed.

Conventionally, in order to connect the stator coils in parallel, it is difficult to wind the two wires simultaneously by binding the start and end portions of the two coils, and thus it is difficult to configure the stator coils in parallel in the single-phase motor.

However, a single-phase motor requiring high drive RPM (rounds per minute) and drive torque requires that the stator coils be connected in parallel while being designed in a productive and efficient manner.

DISCLOSURE

Technical Problem

Accordingly, the present disclosure has been made to solve the above problems, and it is an object of the present disclosure to provide a stacking-type stator using a multi-layered printed circuit board (PCB) capable of realizing a slim-type stator using a multi-layered PCB in which coil patterns are formed, and an in-car sensor using the same.

It is another object of the present disclosure to provide a stacking-type stator including a radial direction pattern portion in which a coil pattern of each layer is oriented in a radial direction capable of maximizing a torque generating efficiency, so that torque generation can be maximized to thus increase a motor efficiency, and an in-car sensor using the stacking-type stator.

It is another object of the present disclosure to provide a stacking-type stator including a radial direction pattern portion that generates a torque by maintaining a predetermined number of reference turns, and a connection pattern portion that integrates (i.e., short-circuits) a plurality of reference turns by a plurality of reference turns, to perform a patterning to have a wide width, and to reduce a resistance loss and a coil loss by minimizing the resistance of coils, thereby reducing the coil temperature and increasing the efficiency, and an in-car sensor using the same.

It is another object of the present disclosure to provide a stacking-type stator including a radial direction pattern portion increasing the density of turns constituting a coil to thereby increase torque and a connection pattern portion integrating (i.e., short-circuiting) individual turns to thereby minimize a resistance, and an in-car sensor using the same.

It is another object of the present disclosure is to provide a stacking-type stator capable of realizing a sensorless motor drive circuit inexpensively and simply by simultaneously arranging a sensing coil pattern for detecting a rotor position on an uppermost layer of a multi-layered printed circuit board (PCB) opposed to a rotor, and to provide a slim-type in-car sensor using the same.

Technical Solution

According to a first aspect of the present disclosure, there is provided a stacking-type stator including: a multi-layered substrate; a plurality of coil patterns formed in a helical shape so as to form a plurality of turns on respective substrates of the multi-layered substrate and interconnected through conductive throughholes; a Hall sensor disposed in the multi-layered substrate and disposed at a position deviated from an interface of a magnetic pole of a rotor when the rotor is in an initial state to thereby detect the magnetic pole of the rotor; and a dead point prevention yoke for setting the position of the rotor such that the Hall sensor is positioned at a position deviated from the interface of the magnetic pole of the rotor when the rotor is in an initial state, wherein the plurality of coil patterns include: a plurality of radial direction pattern portions each disposed along a radial direction to generate a torque to rotate the rotor; and a plurality of inner and outer connection pattern portions that interconnect the plurality of radial direction pattern portions and the plurality of coil patterns form a stator coil for a single phase motor.

The Hall sensor may be positioned at a position deviated from the magnetic pole interface of the rotor positioned by the dead point prevention yoke when the rotor is in an initial state, and may be disposed at a position overlapped with one of the radial direction pattern portions.

In addition, the plurality of coil patterns may have a pattern in which protrusions and recesses are repeated on an outer periphery of a penetration opening formed in a central portion of the multi-layered substrate.

Furthermore, the multi-layered substrate may include a plurality of substrates on which a plurality of coil patterns are respectively formed; and a lowermost substrate on which a motor drive circuit for applying a driving current to the plurality of coil patterns is mounted.

The plurality of radial direction pattern portions of the plurality of coil patterns are connected in such a manner that a current flows in the same direction, thereby generating a rotational force in the tangential direction to a rotor according to the current flow.

The plurality of coil patterns formed on the respective substrates of the multi-layered substrate can be arranged to be formed in the same shape at the same positions, or can be arranged so that the coil patterns formed in the same shape and arranged in even layers can be disposed at a position rotated by 360 degrees divided into the number of radial direction pattern portions around a center of the penetration opening from the coil patterns arranged in odd layers.

A start portion and an end portion of each coil pattern may be formed wider than the portion forming the coil, and at least one throughhole and a soldering land surrounding the throughhole may be disposed.

The dead point prevention yoke is stacked on a lower portion of the stator, and has an outer periphery having a polygonal shape having (the number of magnetic poles)/N (where N is a divisor of the number of magnetic poles), and an inner periphery is circular, and the Hall sensor is installed at a position deviated from a boundary surface or the magnetic pole or a center of the magnetic pole by a ¼ magnetic pole width.

According to a second aspect of the present disclosure, there is provided a stacking-type stator including: a multi-layered substrate; and a plurality of coil patterns formed in a helical shape so as to form a plurality of reference turns on respective substrates of the multi-layered substrate and interconnected through throughholes, wherein the plurality of coil patterns include: a plurality of radial direction pattern portions each disposed along a radial direction to generate a torque to rotate the rotor; and a plurality of connection pattern portions that interconnect inner ends and outer ends of the adjacent radial direction pattern portions, and the plurality of connection pattern portions each have at least one integrated turn by integrating a plurality of reference turns by a plurality of reference turns.

The integrated turn has a wider width than the reference turn, and the integrated turn may be formed by integrating two to three reference turns.

In addition, the plurality of connection pattern portions each may be formed of one integrated turn.

In addition, the coil patterns each may have a zigzag pattern in which protrusions and recesses are repeated on an outer periphery of a penetration opening formed in a central portion of the multi-layered substrate.

The plurality of coil patterns formed on each substrate of the multi-layered substrate may have the same shape.

In addition, the stacking-type stator according to the present disclosure may further include a jumper wire for interconnecting the plurality of coil patterns formed on each substrate of the multi-layered substrate.

The number of the radial direction pattern portions is set to any one of the same number, half the number, and two-times the number as the number of rotor magnetic poles.

According to a third aspect of the present disclosure, there is provided an in-car sensor including: a rotating shaft; a rotor in which the rotating shaft is supported in a central portion of the rotor and a plurality of N-pole magnets and S-pole magnets are disposed alternately; an impeller which is fixed to one end of the rotor and rotates with the rotor; a bearing rotatably supporting the rotating shaft; a bearing holder for receiving and fixing the bearing; a stacking-type stator in which a penetration opening through which the bearing holder passes is formed at the center of the stacking-type stator; a lower housing for supporting the stacking-type stator therein; an upper housing disposed opposite to the lower housing and having a plurality of openings through which indoor air of a vehicle is inhaled from a front end portion of the impeller and the inhaled air is discharged into a portion facing the impeller, when the impeller is rotated; and a temperature sensor arranged in an air flow path through which air is inhaled in the upper housing and measuring the temperature of the inhaled air.

The in-car sensor according to the present disclosure may further include a sensing coil pattern formed in one of the plurality of recesses of the coil pattern to detect the rotor rotational position.

In this case, the motor drive circuit may include a rotor position signal generating unit that generates a rotor position signal corresponding to the rotor magnetic pole when the sensing coil formed by the sensing coil pattern generates an induced electromotive force corresponding to the magnetic pole of the opposing rotor, and a switching circuit for switching the direction of the driving current applied to the stator coil in response to the rotor position signal generated in correspondence to the magnetic pole of the rotor facing the rotor position signal generating unit.

The sensing coil pattern may be positioned at a position deviated by a ¼ magnetic pole width from the magnetic pole interface of the rotor positioned by the dead point prevention yoke or by ¼ magnetic pole width from the center of the magnetic pole, when the rotor is in an initial state.

The sensing coil pattern may be positioned at a position deviated from the magnetic pole interface of the rotor positioned by the dead point prevention yoke when the rotor is in an initial state, and may be disposed at a position overlapped with one of the radial direction pattern portions.

In addition, the bearing holder may include: a base plate disposed at a lower portion of the stator, and having the dead point prevention yoke therein; and a boss protruding upward from the base plate through a penetration opening of the stacking-type stator and receiving and supporting the bearing at a central portion thereof.

In this case, the base plate may be integrally formed with the lower housing.

In addition, the rotor may be formed in a ring shape, and the width of the ring may be formed to be larger at least than the length of the radial direction pattern portion, and the rotor may be arranged to face the radial direction pattern portion.

Further, a sensing coil pattern formed on one of the plurality of recesses of the coil pattern for detecting the rotor rotational position is provided on the uppermost surface of the multi-layered substrate, and the motor drive circuit for applying the driving current to the coil pattern is provided on the lowermost surface of the multi-layered substrate.

A plurality of radial direction pattern portions of the coil pattern disposed on each layer of the multi-layered substrate may be arranged at the same position and set to flow current in the same direction.

The plurality of coil patterns may be connected in series connection, parallel connection, or serial and parallel hybrid connection.

Advantageous Effects

As described above, in the present disclosure, the stator coil for rotating the rotor is implemented as a stacking-type using the conductive pattern coil formed on the multi-layered PCB, thereby realizing a slim-type single-phase motor capable of improving productivity and reducing cost, to thus provide a slim-type aspiration motor for use in an in-car sensor using the stator coil.

Further, in the present disclosure, the coil pattern of each layer includes radial direction pattern portions oriented in the radial direction that can maximize the torque generating efficiency, so that torque generation can be maximized and the motor efficiency can be increased. That is, when the rotor rotates, it is possible to design a coil pattern for increasing the total area of the radial direction pattern portions of the stator coil (winding) and the portions where the magnets face, thereby increasing the torque.

Further, in the present disclosure, the coil pattern of each layer is formed so as to have a zigzag pattern in which a plurality of connection pattern portions and radial direction pattern portions are alternately connected, thereby maximally achieving torque generation in the opposed rotor. That is, the radial direction pattern portions are oriented in the radial direction, so that a tangential force is generated when the stator coil is energized, to thereby obtain an effective torque.

In this case, when the Hall sensor is positioned at a position deviated from the magnetic pole interface of the rotor positioned by the dead point prevention yoke when the rotor is in an initial state, and is disposed at a position overlapped with one of the radial direction pattern portions, since the magnetic flux generated from the magnet is maximum, the Hall sensor can generate the rotor position detection signal with the best sensitivity, and since one of the radial direction pattern portions in the stator is superimposed on the rotor position that generates the maximum magnetic flux, the largest magnetic field interacts with the maximum magnetic flux so that the stator has the optimum condition necessary to start the rotor.

In addition, according to the present disclosure, since an axial type structure using a thin film type stator is employed, a space in which a core type stator used in a radial type motor is removed and a space obtained by omitting a coil terminal connection portion are used so that the diameter of the sleeve bearing supporting the rotating shaft of the rotor can be expanded so as to contain sufficient oil, thereby improving reliability and durability.

Further, in the present disclosure, by setting the through-holes of the respective PCB layers in the PCB at the same position, it is possible to connect the coil patterns of the multi-layered structure in a serial or parallel connection manner, or a serial and parallel hybrid connection manner without using a plurality of wiring pattern PCBs to stack the coil patterns in a slim shape.

According to the present disclosure, radial direction pattern portions generate a torque by maintaining a predetermined number of reference turns, and connection pattern portions integrate (i.e., short-circuit) a plurality of reference turns by a plurality of reference turns, to perform a patterning to have a wide width, and to reduce a resistance loss and a coil loss by minimizing the resistance of coils, thereby reducing the coil temperature and increasing the efficiency.

In the present disclosure, the radial direction pattern portions can increase the torque by maximizing the density of the turns constituting the coils, and the connection pattern portions can integrate (i.e., short-circuit) individual turns to minimize the resistance of each turn.

Particularly, when a plurality of inner and outer connection pattern portions are constituted by one integrated turn, it is possible to form the inner and outer connection pattern portions with a minimum space on the inner and outer sides of the radial direction pattern portions, to thereby maximize the lengths of the radial direction pattern portions. As a result, the total area of the radial direction pattern portions opposed to the magnets of the rotor can be maximized, so that torque generation can be maximized.

In addition, the plurality of inner and outer connection pattern portions are disposed along the circumferential direction at intervals in the inner circumference and the outer circumference which are concentric with each other, and the inner ends of the adjacent radial direction pattern portions are arranged as close as possible, so as to be configured to have a large number of coil turns in a limited area, and as a result, a single-phase motor having high RPM and high torque value can be constructed.

Further, in the present disclosure, the sensor coil pattern is disposed in an empty space where the pattern coil is not formed in the uppermost layer PCB facing the rotor without using the rotor position detecting Hall sensor, thereby making the inexpensive and simple sensorless motor drive circuit.

BEST MODE

Figure 1:
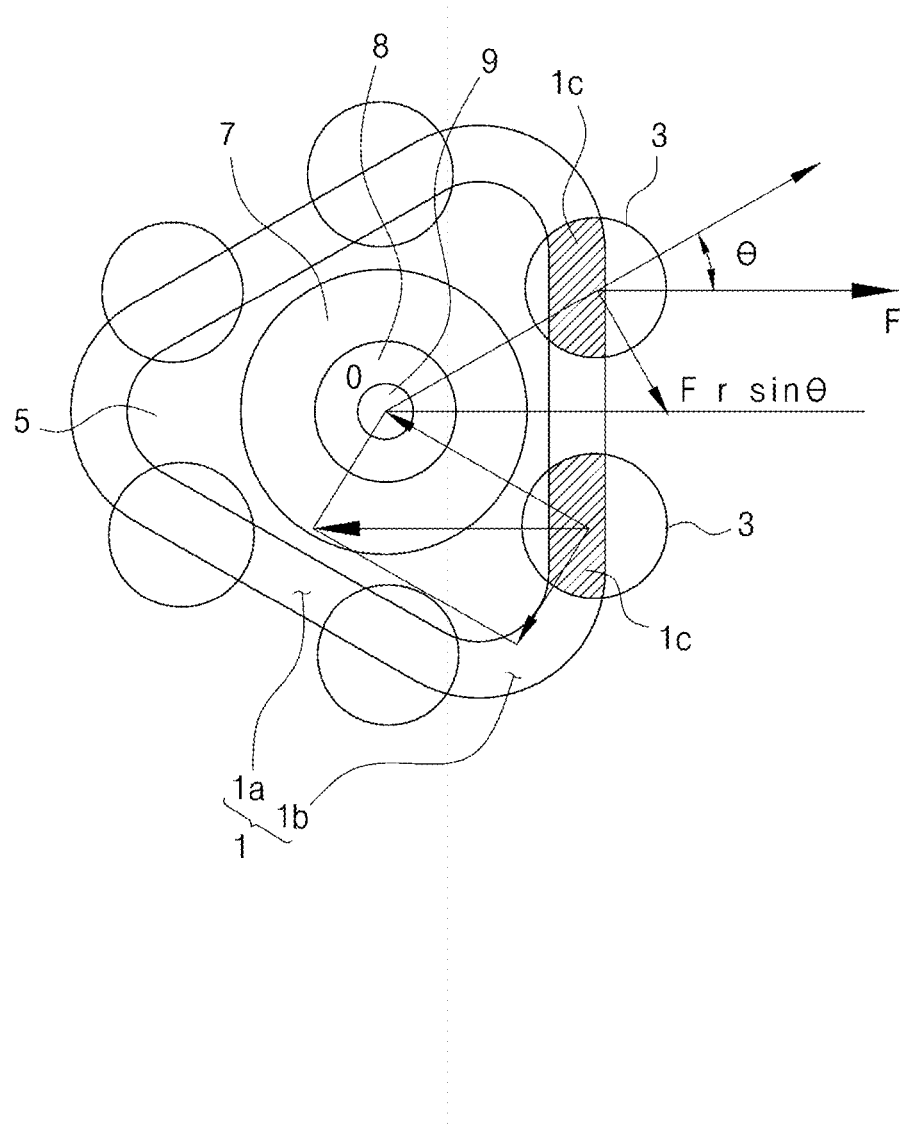
FIG. 1 is an explanatory view for explaining a vector synthesis of forces generated between a stator coil and magnets in a conventional single-phase motor using a stator coil of a triangular shape.

Hereinafter, embodiments of the present invention will be described in detail with reference to the accompanying drawings. The sizes and shapes of the components shown in the drawings may be exaggerated for clarity and convenience.

Prior to describing the present invention, a conventional single-phase motor using a single stator coil of a triangular shape will be described with reference to FIG. 1.

As shown in FIG. 1, a single-phase motor applied to a conventional aspiration motor or the like is configured so that a triangular coreless/bobbinless type stator coil 1 is mounted on a support bracket 5, and a rotor is rotatably supported by a rotating shaft 9 in which N-pole and S-pole magnets 3 are alternately arranged facing the stator coil 1 at an interval. Here, reference numeral 7 denotes a sleeve supporting boss, and reference numeral 8 denotes a sleeve bearing.

When a torque ($\tau$) (that is, a rotation moment) for rotating the rotor in the single-phase motor is obtained, it can be expressed as a vector product as shown in the following equation (1).

$$\tau = r \times F \quad \text{[Equation 1]}$$

Here, F is a force expressed by Fleming's left-hand rule (F=Bil), which is a force vector generated in a conductor (in this case, a winding) through which a current i placed in a magnetic field flows, r is a distance vector between a center of rotation O and a point of action of the force. Since the distance vector r and the force vector F always lie in the same rotating plane, the direction of the torque $\tau$ is always the axial direction.

Referring to FIG. 1, the stator coil 1 is constituted by a stator coil of a triangular shape having three rectilinear portions 1a and three vertexes 1b connecting the three rectilinear portions.

Portions 1c (hatched regions) facing the magnets 3 in the rectilinear portions 1a of the stator coil 1 correspond to regions forming magnetic fields necessary for torque generation. A force F is generated in a direction perpendicular to the rectilinear portion 1a of the stator coil 1 when a current flows clockwise through the stator coil 1 and the stator coil 1 faces the S-pole magnet 3. In this case, since the inner angle formed by the force F and the distance vector r forms the angle θ, the torque $\tau$ for rotating the rotor is obtained as Fr sin θ (scalar value).

Here, when the angle θ formed between the force F and the distance vector r is 90 degrees in order to maximize the torque $\tau$, that is, when the rectilinear portion 1a of the stator coil 1 is oriented toward the center, it can be seen that the force F is generated in the direction perpendicular to the rectilinear portion 1a, that is, in the tangential direction, so that a rotational force for rotating the rotor (magnet) having the largest value can be obtained.

On the contrary, in the vertex 1b of the stator coil 1, since the direction of the force F generated when current flows through the stator coil 1 is the radial direction, the angle θ formed between the force F and the distance vector r becomes 0 degree, and the rotation torque $\tau$ that rotates the rotor (magnet) becomes "0".

Therefore, the torque $\tau$ generated in the conventional stator coil 1 is generated in proportion to the opposing portions 1c between the rectilinear portions 1a of the stator coil 1 (winding) excluding the portions of the vertexes 1b of the stator coil 1 (winding) and the rotating magnets 3, and is obtained by calculating the sum of the areas of the stator coil which meets the magnets 3 while rotating the magnets 3.

Therefore, in the conventional triangular-shaped stator coil 1, since the total area of the portions 1c where the rectilinear portion 1a of the coil 1 (winding) and the magnets 3 face each other when the rotor rotates is small, the torque for rotating the rotor is small and thus the triangular-shaped stator coil 1 does not finally have a coil pattern for effectively generating torque.

The present invention has been proposed in order to solve the problems of the conventional art, and will be described in detail with reference to the accompanying drawings.

The aspiration motor to be applied to the in-car sensor according to the present invention also adopts a single-phase motor having a single coil, and employs a stacking-type stator using a multi-layered printed circuit board so as to maximize the torque generation efficiency while increasing the efficiency of the motor while being a slim-type.

Referring to FIGS. 2 to 5, a stacking-type stator for a single-phase motor according to a first embodiment of the present invention includes: a plurality of substrates 10 in which a plurality of layers are stacked and integrated and made of an insulating material; a plurality of coil patterns 21 to 25 each formed of a helical shape conductive pattern obtained by patterning a copper foil stacked on respective layer substrates so as to form a plurality of turns necessary for constructing a stator coil; and a plurality of throughholes T1 to T7 which are plated on penetration holes formed by penetrating the plurality of substrates 10 to connect the plurality of coil patterns 21 to 25 and the like.

The plurality of coil patterns 21 to 25 include: a plurality of inner and outer connection pattern portions 20a to 20f which are arranged in a circumferential direction at intervals along an inner circumference and an outer circumference; and a plurality of radial direction pattern portions 20g to 20l that interconnect the inner rotating direction pattern portion and the outer rotating direction pattern portion that are adjacent to each other and are disposed along the radial direction from a center thereof.

The stacking-type stator 110 may be constructed by using a multi-layered substrate 10a made of a copper clad laminate (CCL) in which copper foils are stacked on the respective layer substrate 10. The copper foil of each layer substrate is patterned and laminated, thereby forming a conductive throughhole.

In the following description, a multi-layered substrate is described with an example that a coil pattern is formed by patterning a copper clad laminate. However, it is possible to form a multi-layered substrate by printing a coil pattern on a general substrate using silver paste or copper paste without using a copper clad laminate. Even this case should also be regarded as falling within the scope of the present invention.

The substrates 10 may be made of an insulating resin such as FR-4 or CEM-3 made of a glass epoxy laminate, for example, as a substrate material. The multi-layered substrate 10a has a structure in which a copper foil is stacked on each layer substrate 10, and any insulating resin can be used as the material of the substrate as long as a multi-layered printed circuit board (PCB) can be formed. The number of layers of the substrates to be stacked can be set within a range of one to ten layers in proportion to a desired RPM implemented by a single-phase motor. It is required to increase the number of PCB layers stacked to use the plurality of coil patterns 21 to 25 since a large number of coil turns is required so as to obtain a high torque value, in order to obtain a high RPM.

When a multi-layered substrate 10a in which multi-layered PCB layers are stacked is used, a printed wiring 17 for interconnecting a coil pattern and an electronic component is formed on a rear surface of the lowermost PCB layer, and various electronic components 16 are mounted on the printed wiring 17, to thus form a motor drive circuit 30. A drive power supply Vcc is connected to the power supply terminal of the printed wiring 17 and the ground pattern GND.

The stacking-type stator 110 for a single-phase motor according to the present invention may be constructed using a double-sided substrate having a copper foil laminated on both sides of the substrate 10, in which case a high RPM is not required. The coil pattern 21 may be formed on one surface of the substrate 10 and the motor drive circuit 30 may be mounted on the other surface of the substrate 10.

Figure 3:
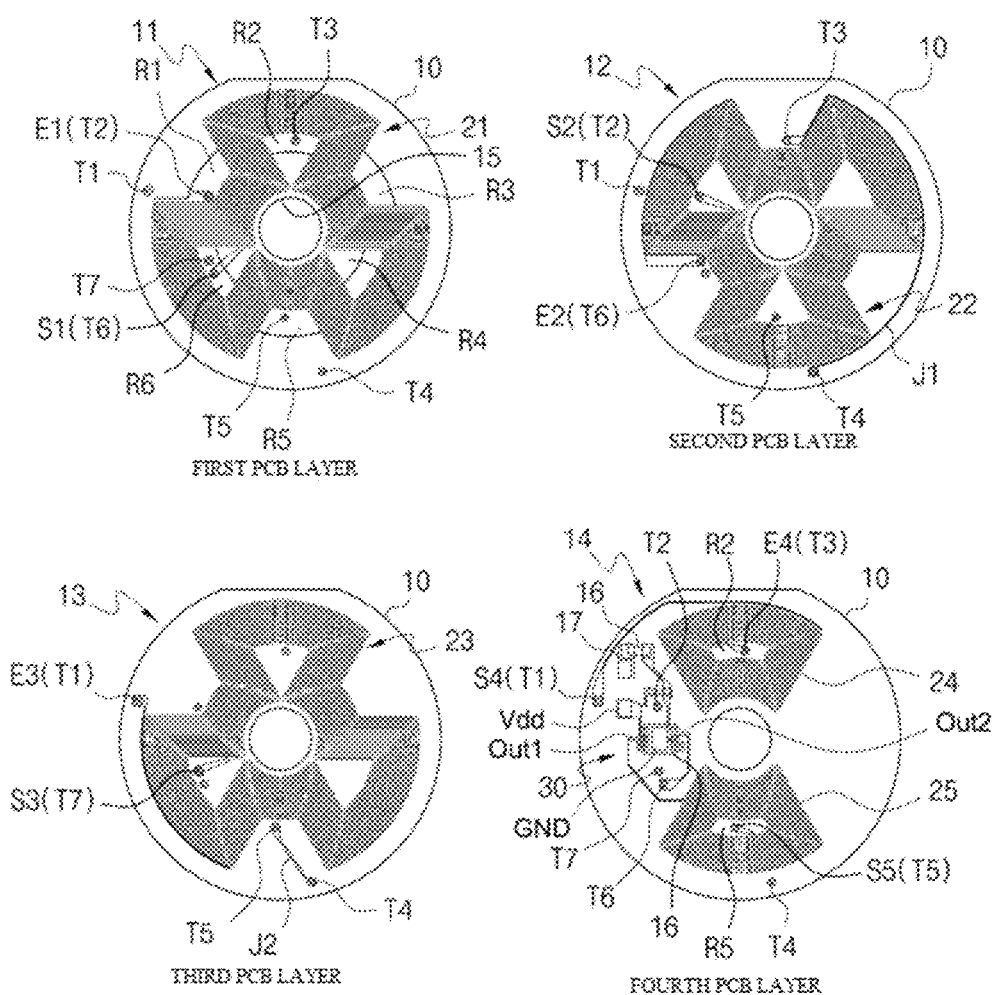
FIG. 3 is a developed view showing coil patterns for each layer of the stacking-type stator according to the first embodiment of the present disclosure.

In the following description of the embodiment, as shown in FIG. 3, the multi-layered substrate 10a is formed by stacking first to fourth PCB layers 11 to 14 having a four-layer structure as an example.

The first to third PCB layers 11 to 13 are respectively formed with first to third coil patterns 21 to 23 having a star shape, for example, on the upper surface of the substrate 10 and the fourth PCB layer 14 of the lowermost layer is formed with, for example, separate fan-shaped fourth and fifth coil patterns 24 and 25, respectively, and are formed by finely patterning a conductive metal such as a copper (Cu) foil, for example. Each of the PCB layers 11 to 14 may be selected from among those having various thicknesses of, for example, 0.4 mm and 0.8 mm, and the coil patterns 21 to 25 applied to this embodiment are patterned so that, for example, the pattern width is 0.12 mm, and the interval between adjacent patterns is 0.13 mm. The width of the coil pattern and the distance between the patterns can be increased or decreased as needed.

The first and third coil patterns 21 and 23 and the fourth coil pattern 24 are formed so as to have a helical shape in a clockwise (CW) direction from the inside to the outside, respectively, and have a zigzag shape so as to have three protrusions and three recesses to form a roughly "star" shape. The second coil pattern 22 and the fifth coil pattern 25 are formed so as to have a helical shape in a counter-clockwise (CCW) direction from the inside to the outside, respectively, and have a zigzag shape so as to have three protrusions and three recesses to form a roughly "star" shape.

Of course, each of the first to third coil patterns 21 to 23 has a helical shape and is directed from the inside to the outside or from the outside to the inside depending on the connection pattern of the coil pattern using the throughholes. Each of the first to third coil patterns 21 to 23 can be configured by combining patterns oriented in a CW or CCW direction, and may have a zigzag shape so as to have two or more protrusions and two or more recesses in a large scale.

Each of the first to third coil patterns 21 to 23 includes three outer and inner connection pattern portions 20a to 20c and 20d to 20f and six radial direction pattern portions 20g to 20l connecting the three outer coil connection pattern portions 20a to 20c and the three inner connection pattern portions 20d to 20f which are alternately connected to form a star shape as a whole.

The outer and inner connection pattern portions 20a to 20c and 20d to 20f are arranged along the circumferential direction with an interval between the outer circumference and the inner circumference, respectively, and each of the six radial direction pattern portions 20g to 20l is set in a direction which radiates from the center of the substrate as a whole such that the inner ends thereof have a pattern shape in which the interval between every two inner ends is narrower.

The first and third coil patterns 21 and 23 of the first and third PCB layers 11 and 13 are formed in the same shape and the second coil pattern 22 of the second PCB layer 12 is formed in the same shape as the first and third coil patterns 21 and 23, but is deviated by a phase difference of 60 degrees.

As a result, when the first to third PCB layers 11 to 13 are stacked, the six radial direction pattern portions 20g to 20l in the first to third coil patterns 21 to 23 are arranged at the same position. Therefore, as will be described later, when three PCB layers are stacked, the radial direction pattern portions 20g to 20l have positions where the coil patterns stacked in three layers are opposed to the magnets of the rotor at the same time, and the flow direction of the current is set equal. As a result, the resultant torque can be generated.

The stator 110 according to an embodiment interconnects the first to fifth coil patterns 21 to 25 formed on the multi-layered PCB to form a stator coil. The number of the radial direction pattern portions 20g to 20l in the stator coil has a value of any one of the same number as the number of rotor magnetic poles, one-half of the number of rotor magnetic poles, and two times of the number of rotor magnetic poles, and simultaneously an angle between the adjacent radial direction pattern portions from among the radial direction pattern portions 20g to 20l is set to a value of 360°/n where n may be any one of the same number, half the number, and two-times the number as the number of rotor magnetic poles.

Therefore, in the case of a stator having six radial direction pattern portions 20g to 20l, the angle between the adjacent radial direction pattern portions 20g to 20l is 60° and the number of the magnetic pole of the rotor, that is, the number of the N-pole magnets and the S-pole magnets have six poles, in which the rotor is coupled to a single-phase motor to rotate to form the single-phase motor.

The printed wiring 17 necessary for mounting and wiring various electronic components 16 is formed in the fourth PCB layer 14 in a conductive pattern so as to form the driving circuit 30 necessary for driving the single-phase motor.

In addition, the fourth PCB layer 14 may be formed to include fourth and fifth coil patterns 24 and 25 to be added to the first to third coil patterns 21 to 23 by utilizing a space remaining after mounting the driving circuit component, and the fourth and fifth coil patterns 24 and 25 may be omitted depending on the torque value required to rotate the rotor.

The illustrated fourth PCB layer 14 is shown in a perspective view, and various patterns, i.e., the fourth and fifth coil patterns 24 and 25, and the printed wiring 17 and the electronic component 16 mounted thereon are located on the rear surface of the substrate 10.

The fourth coil pattern 24 is a fan-shaped pattern having a helical shape in a clockwise (CW) direction from the outside to the inside, and the fifth coil pattern 25 is a fan-shaped pattern having a helical shape in a counterclockwise (CCW) direction from the inside to the outside.

When the first to fourth PCB layers 11 to 14 according to an embodiment are stacked, the first to fifth coil patterns 21 to 25 are interconnected in serial or parallel manner through the first to seventh throughholes T1 to T7, to thereby form one stator coil. The first to seventh throughholes T1 to T7 are plated or filled with a conductive material in the throughholes.

In the stator for a single-phase motor according to the present invention, the first to third PCB layers 11 to 13 form a coil pattern layer, in which first to third coil patterns 21 to 23 having a star shape are formed on an upper surface of a substrate 10, and the fourth PCB layer 14 forms a drive circuit layer in which the motor drive circuit 30 is mounted.

Figure 4A:
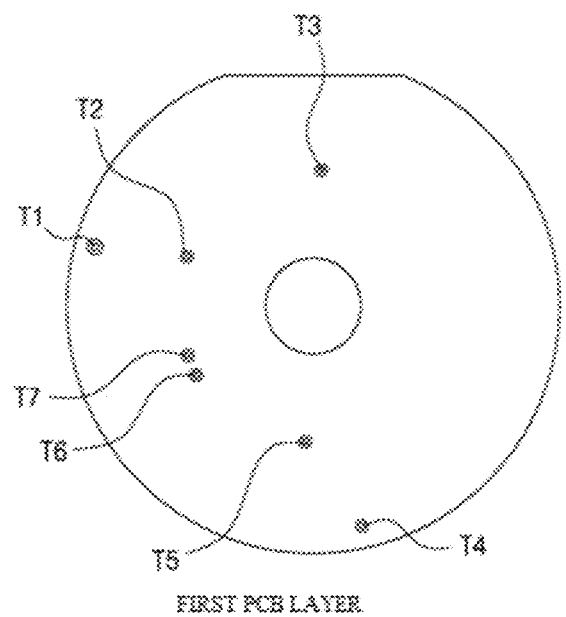
FIGS. 4A and 4B are plan views showing soldering patterns of the first and fourth PCBs, respectively.
Figure 4B:
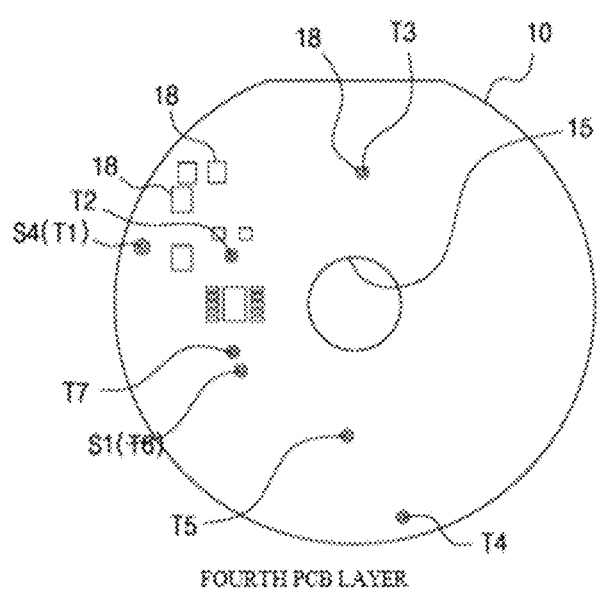

In some embodiments, seven throughholes T1 to T7 are formed at the same positions as the first to fourth PCB layers 11 to 14 as shown in FIG. 4A, and a soldering land 18 is formed as a conductive pattern as shown in FIG. 4B. As shown in FIG. 3, the start portions S1 to S5 and the end portions E1 to E4 of the first to fifth coil patterns 21 to 25 are formed wider than the portions forming the coils (windings), for example, in the form of a tear drop, and the throughholes T1 to T7 and soldering lands 18 surrounding the throughholes T1 to T7 are disposed.

As a result, in some embodiments, the start portions S1 to S5 and the end portions E1 to E4 are designed to be wider than the portions forming the coils (windings) by controlling the thickness of respective layer coil patterns 21 to 25 in the stacking-type stator, to thereby increase the reliability of the connections.

That is, the start portion and the end portion of the coil pattern are formed in the form of a tear drop, and the throughholes and the soldering lands surrounding the throughholes are disposed to interconnect the coil patterns, or ease the connections to the wiring patterns and guarantee the reliability of the connections.

Further, in order to increase the reliability, at least one throughhole connecting the start portion and the end portion to each layer may be formed so as to prevent the reliability from being deteriorated due to the breakage of the wire or the badness of the throughhole.

In order to connect the fourth coil pattern 24 and the fifth coil pattern 25 which are separately formed on the upper and lower sides of the fourth PCB layer 14, a first jumper wire pattern J1 connecting the throughholes T3 and T4 is formed on the outer periphery of the second coil pattern 22, in the second PCB layer 12, and in order to connect an internal start portion S5 with the outside of the fifth coil pattern 25 on the fourth PCB layer 14, a second jumper wire pattern J2 connecting a fourth throughhole T4 and a fifth throughhole T5 is formed on the outer side of the third coil pattern 23, in the third PCB layer 13.

When the first to fourth PCB layers 11 to 14 according to an embodiment are stacked, the first to fifth coil patterns 21 to 25 are interconnected via the throughholes T1 to T7 and the first and second jumper wire patterns J1 and J2, to thereby form one stator coil.

That is, the end portion E1 of the first coil pattern 21 of the first PCB layer 11 is connected to the start portion S2 of the second coil pattern 22 of the second PCB layer 12 through the second throughhole T2, and the end portion E2 of the second coil pattern 22 is connected to the start portion S3 of the third coil pattern 23 of the third PCB layer 13 through the sixth throughhole T6.

In addition, the end portion E3 of the third coil pattern 23 is connected to the start portion S3 of the fourth coil pattern 24 of the fourth PCB layer 14 through the first throughhole T1, and the end portion E4 of the fourth coil pattern 24 and the start portion S5 of the fifth coil pattern 25 are interconnected through the first jumper wire pattern J1 connecting the throughhole T3 and the throughhole T4 and the jumper wire pattern J2 connecting the throughhole T4 and the throughhole T5.

As a result, one end of the stator coil, that is, the end portion of the fifth coil pattern 25 is connected to the first output terminal Out1 of the motor drive circuit and the other end of the stator coil, that is, the start portion S1 of the first coil pattern 21 is connected to the second output terminal Out2 of the motor drive circuit via the sixth throughhole T6.

In some embodiments, the widths of the first to fifth coil patterns 21 to 25 are set so that six throughhole regions R1 to R6 where the coil patterns are not overlapped with each other are present between the inner circumferential portion of the outer connection pattern portions 20a to 20c of the first and third coil patterns 21 and 23 and the outer circumferential portion of the inner connection pattern portion of the second coil pattern 22, and between the outer circumferential portion of the inner connection pattern portions 20d to 20f of the first and third coil patterns 21 and 23 and the inner circumferential portion of the outer connection pattern portions of the second coil pattern 22, and the first to seventh throughholes T1 to T7 are disposed by using the six throughhole regions R1 to R6 and outer spaces of the first to fifth coil patterns 21 to 25.

As a result, in some embodiments, when connecting the start or end terminal disposed inside the first to fifth coil patterns 21 to 25 to the coil pattern of the other PCB layer, the throughholes T2, T3, and T5 to T7 formed by using one of the six throughhole regions R1 to R6 may be used.

In some embodiments, the throughholes T1 to T7 are disposed by appropriately using the throughhole regions R1 to R6 and the outer space so that the coil patterns of the multi-layered PCB can be connected in series or in parallel without using a separate wiring pattern PCB.

Figure 2:
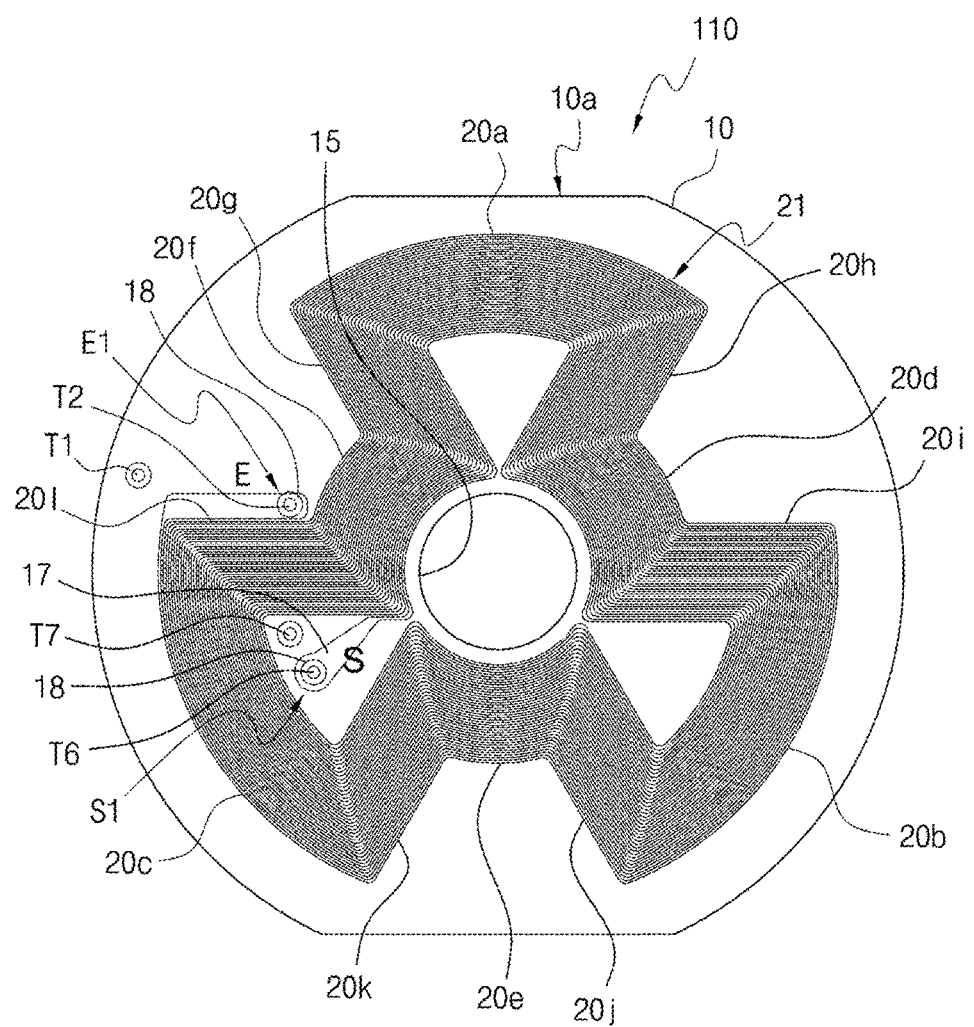
FIG. 2 is a plan view showing a stacking-type stator for a single-phase motor according to a first embodiment of the present disclosure.

Although the motor drive circuit 30 for driving the single-phase motor is mounted on the fourth PCB layer 14 in the embodiment shown in FIG. 2, the motor drive circuit may be separately formed. That is, when a sufficient space cannot be secured between the stator and the supporting portion on which the stator is mounted, only a minimum number of driving circuit components can be mounted on the rear surface of the fourth PCB layer 14.

Figure 5:
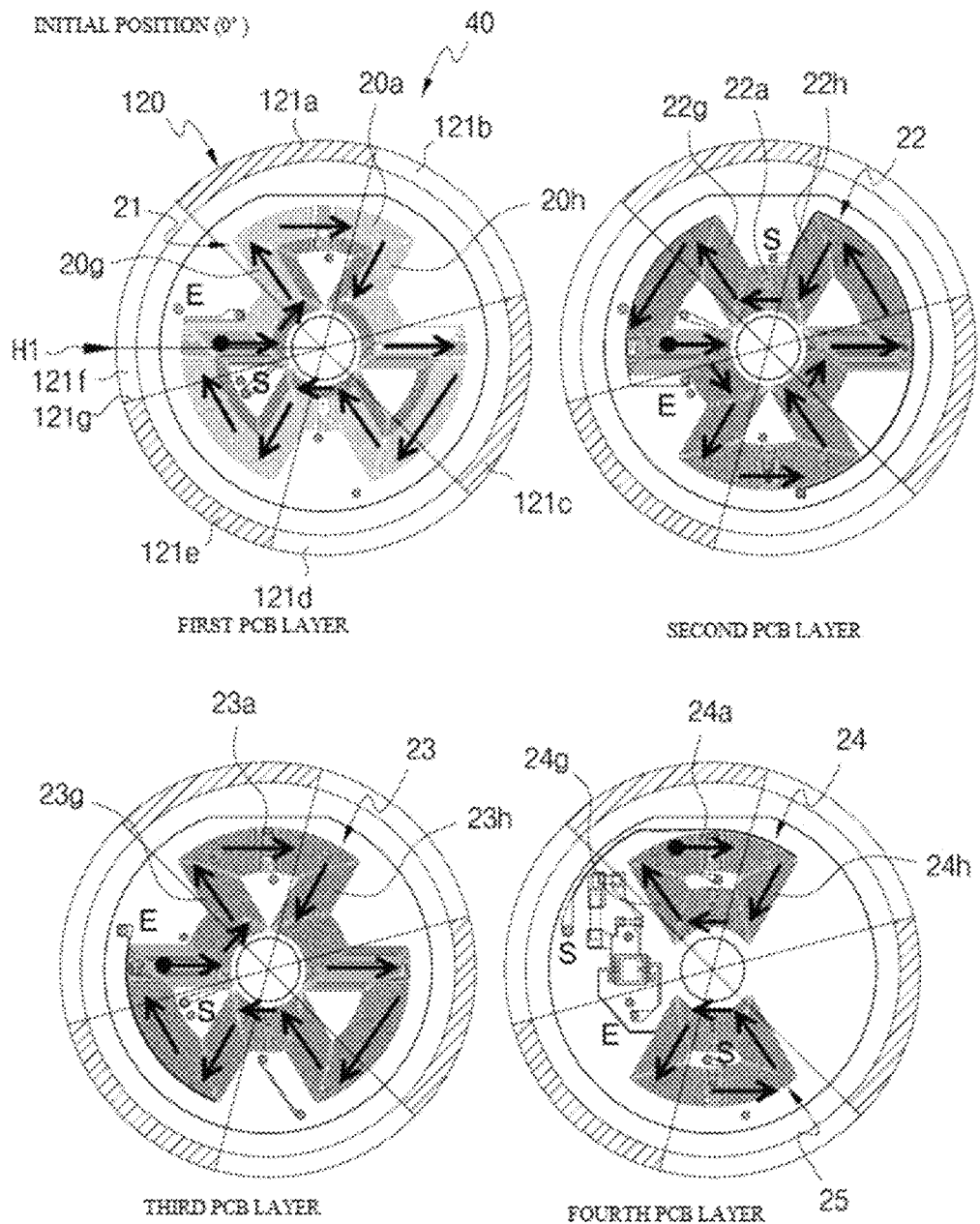
FIG. 5 shows explanatory diagrams for explaining the operation of a single-phase motor using a stacking-type stator according to the present disclosure, which show the directions of currents when the rotor is at the initial position.

Hereinafter, a single-phase motor using the stacking-type stator according to a first embodiment of the present invention will be described with reference to FIGS. 5 to 6D. In FIGS. 5 to 6D, the current flow for each rotational position of the rotor is the same as the current flow for the first coil pattern 21 of the first PCB layer 11 and the second to fifth coil patterns 22 to 25 of the second to fourth PCB layers 12-14 and thus only the first coil pattern 21 of the first PCB layer 11 will be described.

The single-phase motor 40 illustrated has a structure in which a stator 110 and a rotor 120 of a 6-slot-6-pole structure are arranged in an axial type so as to face each other, but the stator 110 and the rotor 120 of the 6-slot-6-pole structure are shown together on the same plane for convenience of explanation.

The motor drive circuit 30 for single-phase motors, for example, detects the magnetic poles of the magnets from the Hall sensor H1 and generates a pair of first rotor position detection signals of opposite polarities. In doing so, one of the first and second switching transistors is turned on and the other is turned off to determine the direction of current flow through the stator coil connected between the first and second switching transistors.

Figure 8:
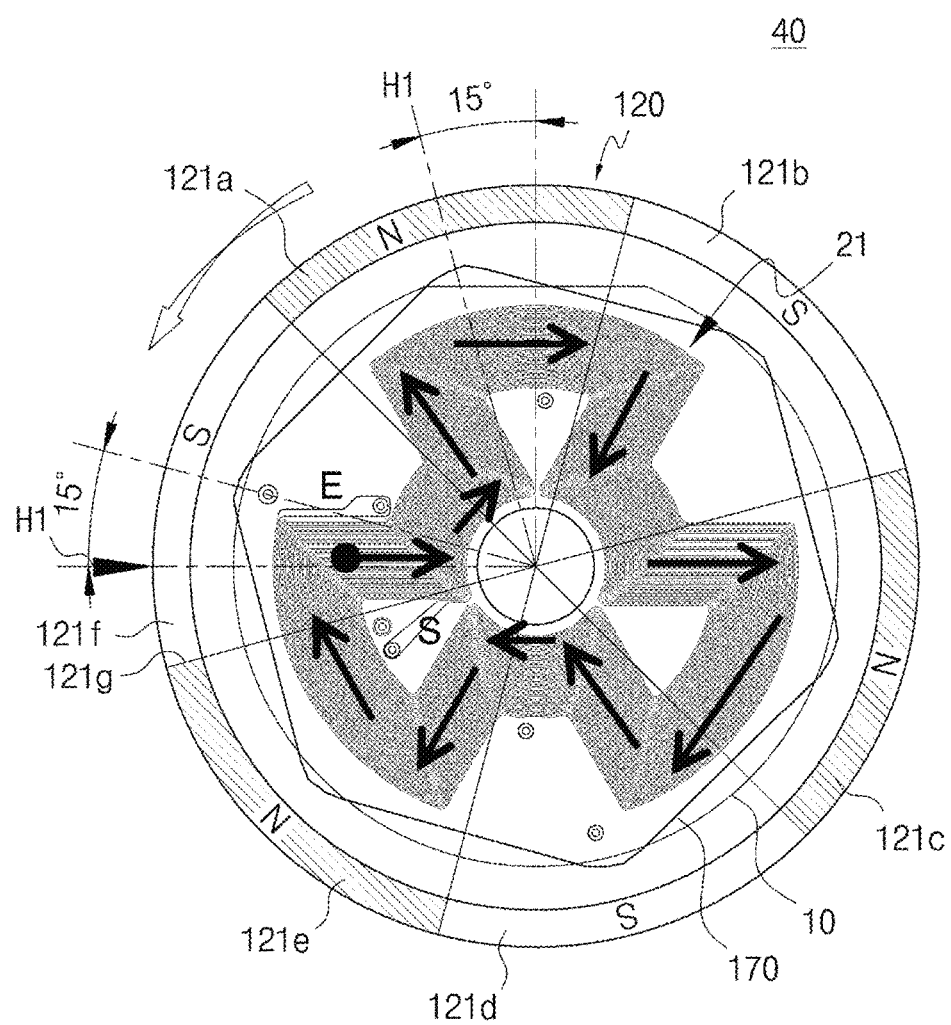
FIG. 8 is an explanatory view for explaining the arrangement relationship of a dead point prevention yoke for self-starting and a Hall sensor in a single-phase motor according to the present disclosure.

As shown in FIGS. 5 and 8, in the illustrated embodiment, the Hall sensor H1 is installed at a position deviated by 15 degrees from the interface 121g between the N-pole magnet 121e and the S-pole magnet 121f. The mounting position of the Hall sensor H1 will be described in detail with reference to FIG. 8.

As shown in FIG. 5, when the drive power source Vcc is supplied to the motor drive circuit 30 when the rotor 120 is at the initial position (i.e., 0 degree), the Hall sensor H1 recognizes the S-pole magnet 121f of the rotor 120 and generates a pair of first rotor position detection signals containing the rotation direction of the rotor (i.e., counterclockwise (CCW) direction). By doing so, when the Hall sensor H1 applies the pair of first rotor position detection signals to first and second switching transistors, the first switching transistor is turned on and the second switching transistor is turned off so that the current flow directions of the drive currents with respect to the stator coil, that is, the first to fifth coil patterns 21 to 25 are determined.

The current flows in the direction from the start portion S1 of the first coil pattern 21 to the end portion of the fifth coil pattern 25 as the rotating direction of the rotor is determined as the counterclockwise (CCW) direction, and the directions of current flow is indicated by arrows in the first to fifth coil patterns 21 to 25.

In this case, since the outer and inner connection pattern portions 20a to 20c and 20d to 20f of the first to fifth coil patterns 21 to 25 are arranged in a substantially concentric circle shape, the force (F) generated by the Fleming's left-hand rule is directed in the radial direction and thus does not affect the torque generation.

The first to fifth coil patterns 21 through 25 are connected to each other via the throughholes T1 through T7 and the jumper wire patterns J1 and J2 so that the flow directions of the driving currents flowing through the radial direction pattern portions at the same positions are the same.

For example, the radial direction pattern portions 20g and 20h of the first coil pattern 21 are arranged so that the direction of current flow is set in the same direction as the radial direction pattern portions 22g and 22h of the second coil pattern 22, the radial direction pattern portions 23g and 23h of the third coil pattern 23, and the radial direction pattern portions 24g and 24h of the fourth coil pattern 24. As a result, the radial direction pattern portions 20g to 20l are oriented in the radial direction (i.e., normal direction) perpendicular to the rotating direction (i.e., circumferential direction) of the rotor 120, and thus a tangential force F is generated in the counterclockwise (CCW) direction according to the Fleming's left-hand rule.

Therefore, the outer and inner connection pattern portions 20a to 20c and 20d to 20f of the first to fifth coil patterns 21 to 25 serve only as a path through which current flows, and a force F is generated in the tangential direction from the six radial direction pattern portions 20g to 20f, to rotate the rotor 120.

Further, the directions of the currents flowing in the coils between the adjacent radial direction pattern portions 20g to 20l are set opposite to each other, and the magnetic poles of the corresponding magnets of the rotor 120 are also reversely positioned. Thus, the force pushing or pulling the magnets of the rotor in the same direction is generated to thereby rotate the rotor counterclockwise (CCW).

As described above, in the single-phase motor using the stacking-type stator according to the first embodiment of the present invention, the radial direction pattern portions 20g to 20l are connected so that current flows in the same direction, and generates a tangential rotational force on the rotor in accordance with the current flow.

In this case, the outer and inner connection pattern portions 20a to 20c and 20d to 20f of the first to fifth coil patterns 21 to 25 are connected in such a manner that electric current flows in opposite directions to each layer, but are arranged in a concentric circle shape. Accordingly, the direction of the force F generated in accordance with the Fleming's left-hand rule is radially directed, so that it does not affect the torque.

Figure 6A:
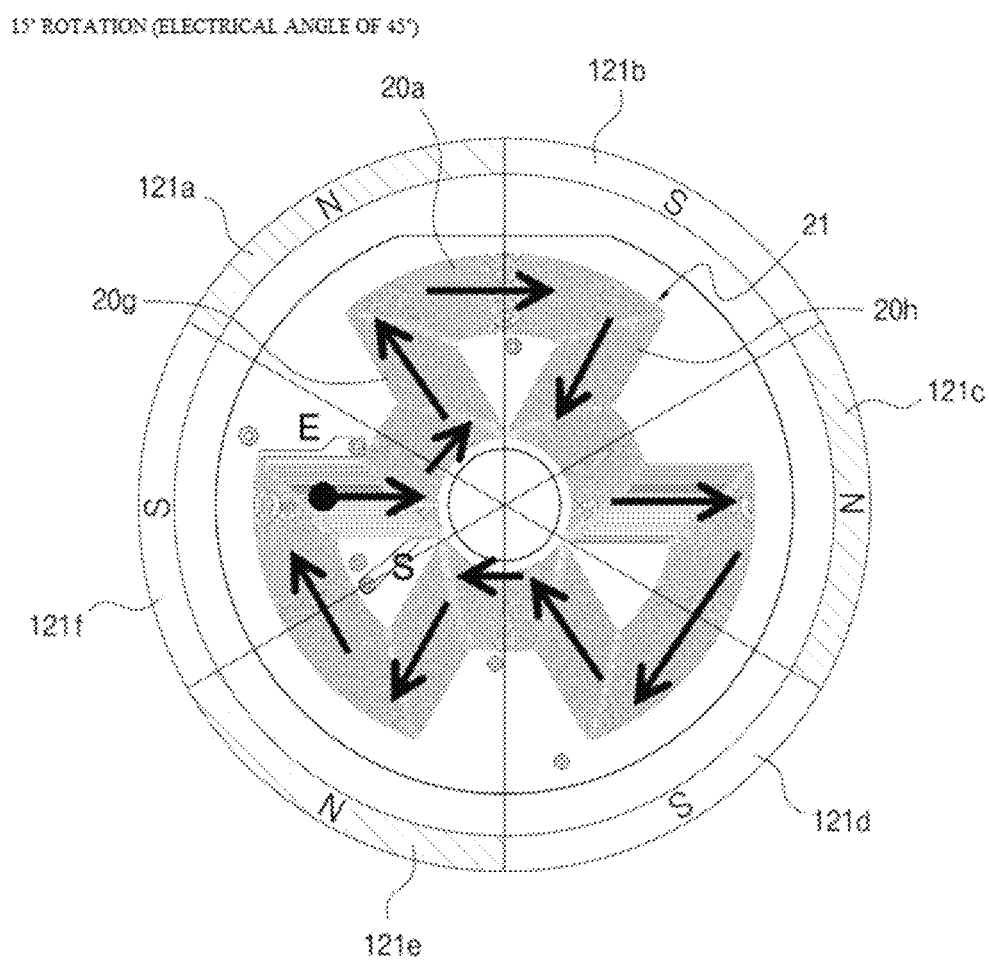
FIGS. 6A to 6D are explanatory diagrams showing directions of currents according to the rotating positions of the rotor, respectively.
Figure 6B:
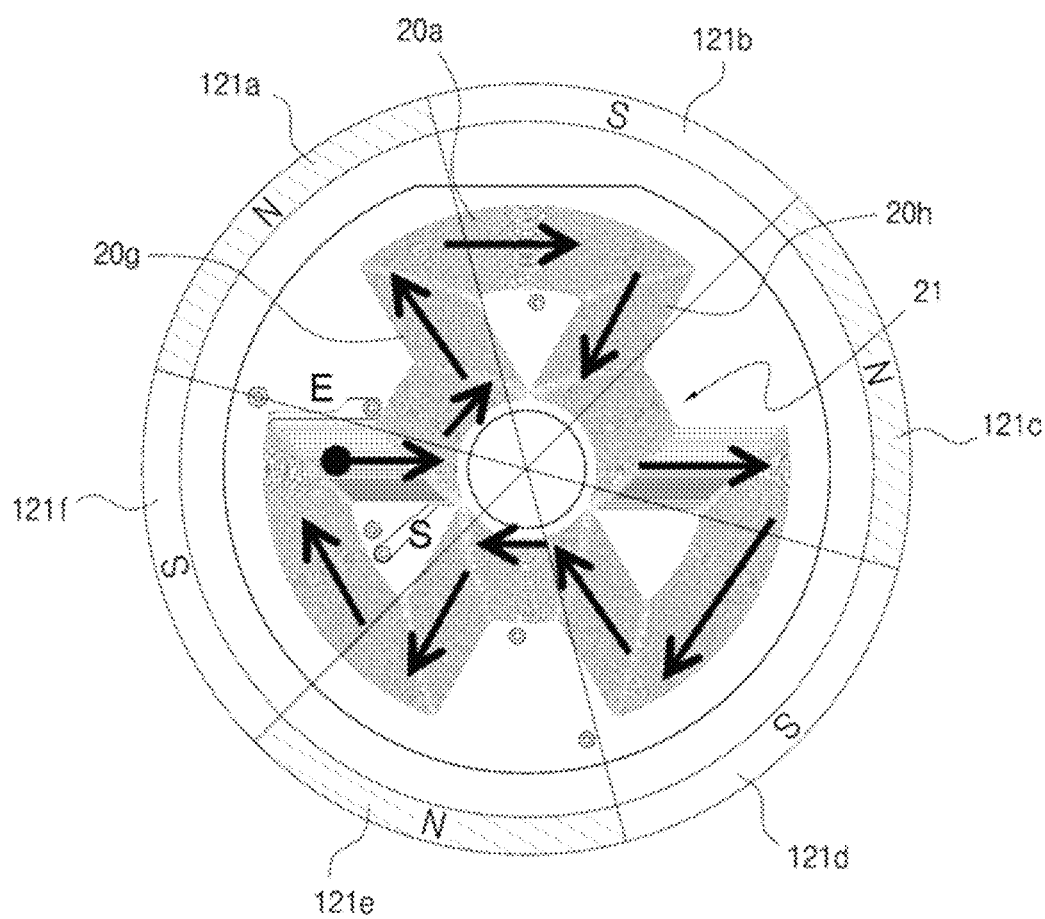
Figure 6C:
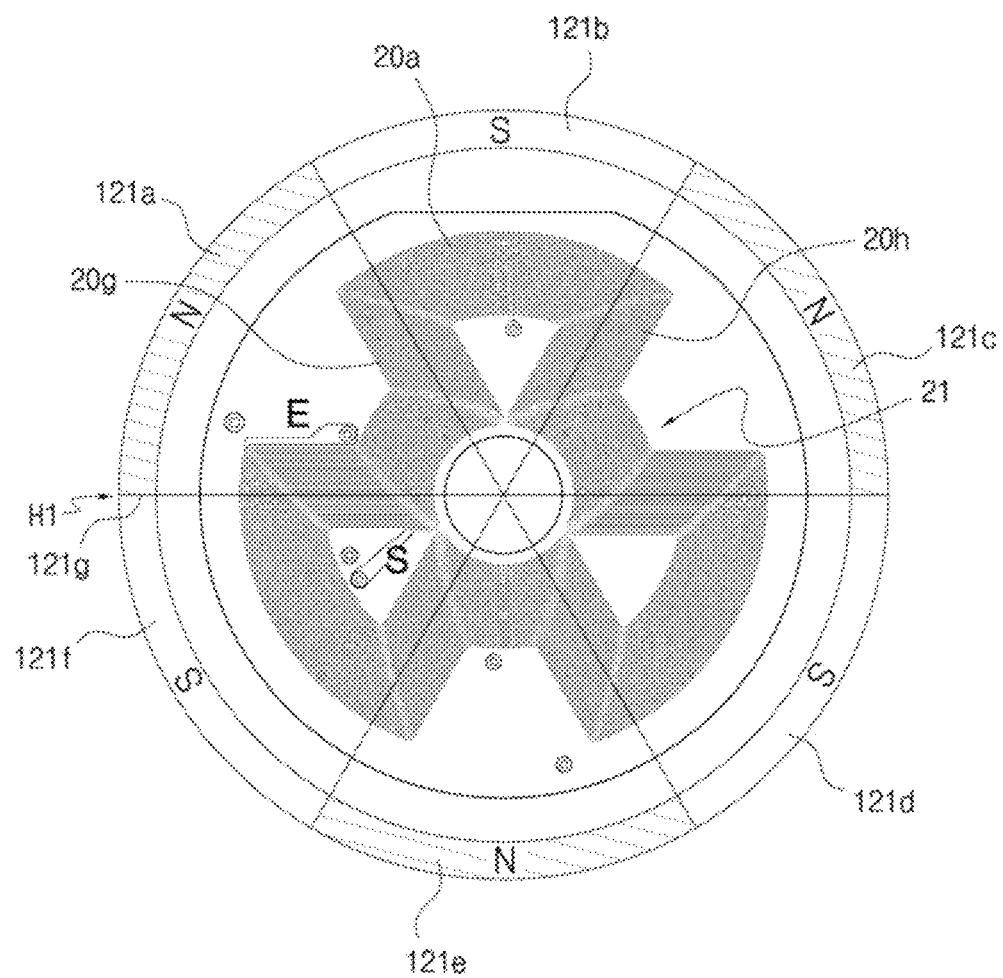
Figure 6D:
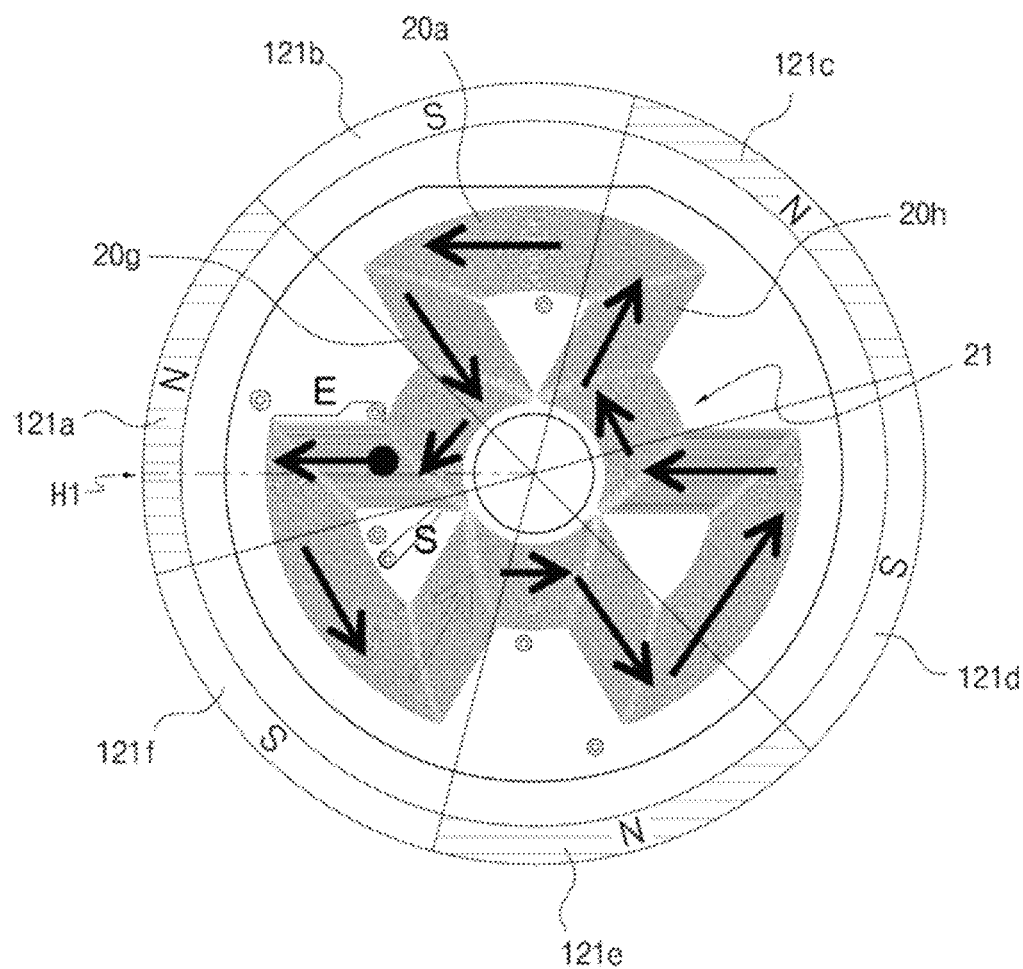

FIG. 6A shows a case where the rotor 120 is rotated by 15° in a mechanical angle (or by 45° in an electrical angle), and FIG. 6B shows a case where the rotor 120 is rotated by 30° in a mechanical angle (or by 90° in an electrical angle), and FIG. 6C shows a case in which the rotor 120 is rotated by 45° in a mechanical angle (or by 135° in an electrical angle).

When the rotor 120 is positioned at the position shown in FIG. 6C, the Hall sensor H1 is located at the interface 121g between the N-pole magnet 121a and the S-pole magnet 121f, and thus the Hall sensor H1 does not recognize the magnetic pole, and does not determine the flow direction of the current.

FIG. 6D shows a case where the rotor 120 is continuously rotated by the rotational inertia and rotated by 60° in a mechanical angle (or by 180° in an electrical angle). When the rotor rotates over 45° in a mechanical angle (or over 135° in an electrical angle), the Hall sensor H1 recognizes the N-pole magnet 121a. In this case, the Hall sensor H1 generates a pair of second rotor position detection signal outputs having the opposite polarity to the first rotor position detection signals and applies the generated pair of second rotor position signal outputs to first and second switching transistors, so that the first switching transistor is turned off and the second switching transistor is turned on and thus the current flow directions of the driving currents to the stator coils, that is, the first to fifth coil patterns 21 to 25, are set to be opposite as shown in FIG. 6D.

As a result, as shown in FIG. 6D, when the current flow directions of the driving currents for the first to fifth coil patterns 21 to 25 are reversed, the radial direction pattern portions 20g to 20l generate a tangential force F in the counterclockwise (CCW) direction in accordance with the Fleming's left-hand rule to thereby rotate the rotor 120.

As described above, the motor drive circuit 30 detects the magnetic pole of the rotor every time the Hall sensor H1 rotates by 60° in a mechanical angle (or by 180° in an electrical angle), and alternates between the first rotor position detection signal and the second rotor position detection signal. Accordingly, the first and second switching transistors are alternately turned on and off to change the directions of current flows of the driving currents to the first to fifth coil patterns 21 to 25.

As described above, in the stacking-type stator 110 according to the first embodiment of the present invention, the stator coil is implemented as a stacked type using the conductive pattern coils 21 to 25 formed on the multi-layered PCB, thereby improving the productivity and reducing the cost.

In addition, the stacking-type stator according to some embodiments of the present invention includes radially oriented radial direction pattern portions 20g to 20l so that the coil pattern of each layer can maximize the torque generation efficiency, and is designed so as to maximize the total area of the portions where the radial direction pattern portions 20g to 20l of the stator coil (winding) and the magnets 121a to 121f face each other when the rotor 120 rotates.

Figure 12:
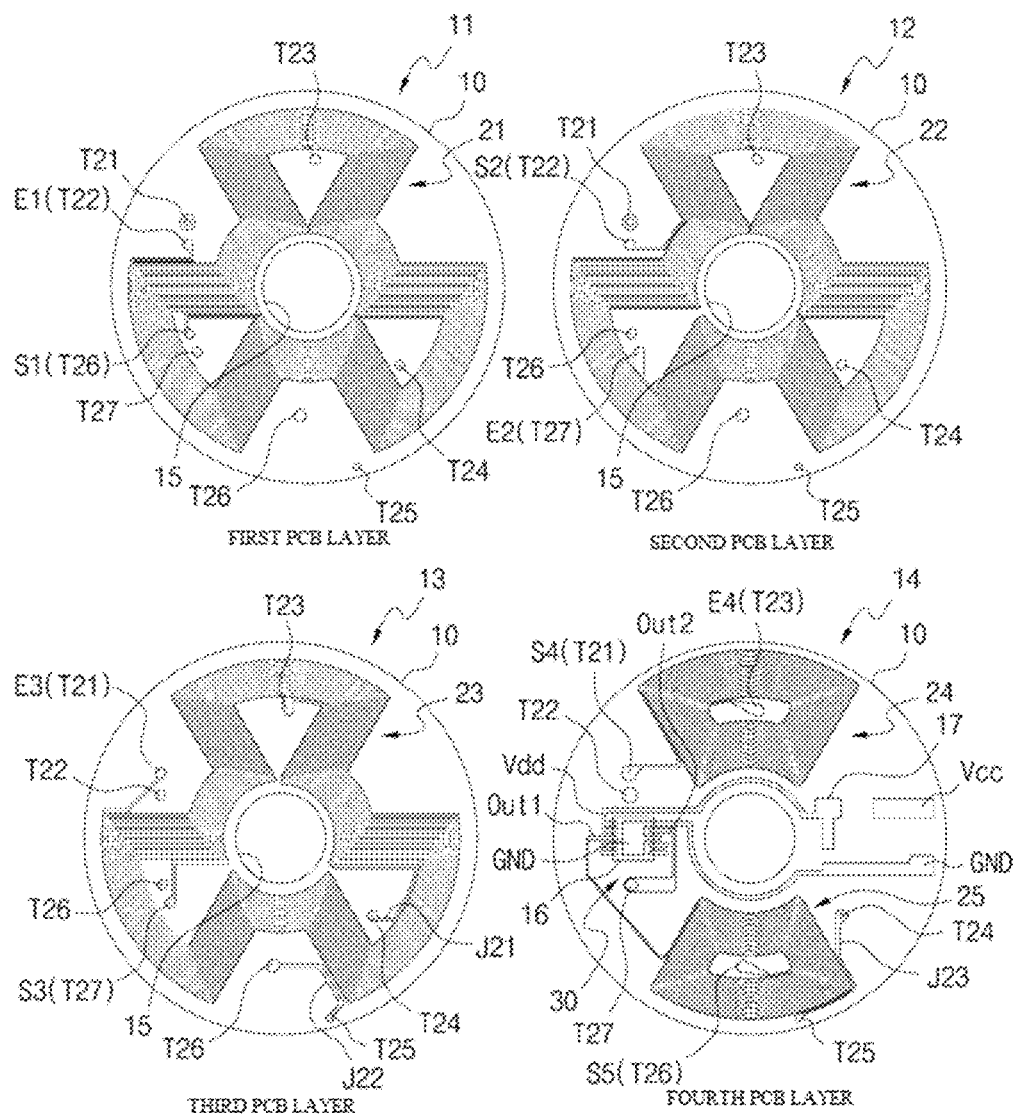
FIG. 12 shows development views showing coil patterns for each layer of the stacking-type stator according to the third embodiment of the present disclosure.
Figure 13:
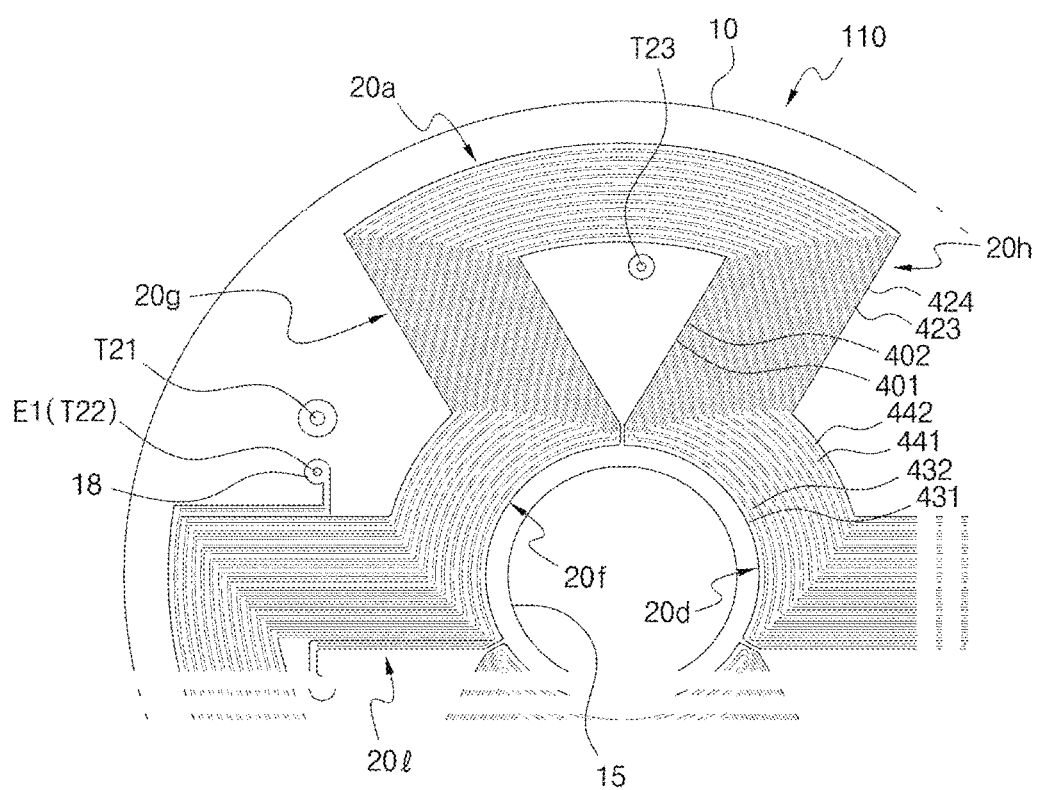
FIG. 13 is a partially enlarged view of FIG. 11.

In this case, as shown in FIGS. 12 and 13, when the magnets are formed into a ring shape, and the width of the ring is formed to be at least larger than the length of the radial direction pattern portions 20g to 20l, in order that the rotor 120 is arranged to face the radial direction pattern portions 20g to 20l, the total area of the portions where the radial direction pattern portions 20g to 20l and the magnets 121a to 121f face each other can be maximized, so that torque generation can be maximized.

Hereinafter, a stacking-type stator according to a second embodiment of the present invention will be described with reference to FIG. 7.

First, the stacking-type stator 110 according to the first embodiment shown in FIG. 2, is configured to have the first and third coil patterns 21 and 23 and the fourth coil pattern 24 have a helical shape in a clockwise (CW) direction and the second coil pattern 22 and the fifth coil pattern 25 have a helical shape in the counterclockwise (CCW) direction. That is, in the first embodiment, the coil patterns of the odd-numbered PCB layer are formed to have a helical shape in the clockwise (CW) direction, and the coil patterns of the even-numbered PCB layer are formed to have a helical shape in the counterclockwise (CCW) direction.

Figure 7:
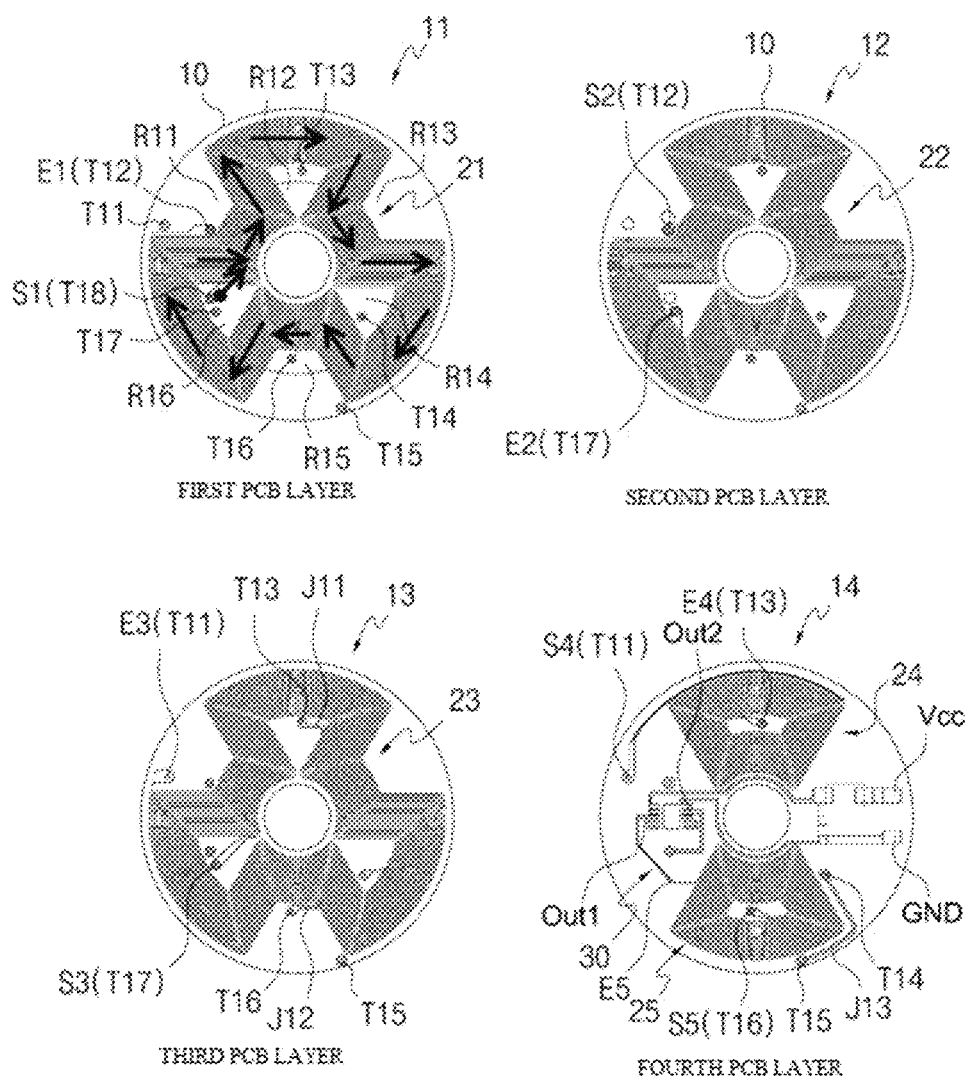
FIG. 7 shows development views showing coil patterns for respective PCB layers of a stacking-type stator for a single-phase motor according to a second embodiment of the present disclosure.

The stacking-type stator according to the second embodiment shown in FIG. 7, is configured to have all of the first to fourth coil patterns 21 to 24 have a helical shape in the clockwise (CW) direction, and only the fifth coil pattern 25 have a helical shape in the counterclockwise (CCW) direction.

In the second embodiment, the coil patterns 21 to 23 of the first to third PCB layers 11 to 13 are formed in the same shape patterns and have a helical shape in the clockwise (CW) direction. In this matter, the second embodiment differs from the first embodiment. However, since the fourth and fifth coil patterns 24 and 25 of the fourth PCB layer 14 are disposed at positions opposed to each other in a line symmetrical structure, the fourth coil pattern 24 in both the first and second embodiments is wound in the clockwise (CW) direction, and the fifth coil pattern 25 has a pattern wound in the counterclockwise (CCW) direction.

The stacking-type stator according to the second embodiment is characterized in that when the coil patterns 21 to 23 of all the PCB layers are formed of windings having a helical shape in the clockwise (CW) direction, the first and third coil patterns 21 and 23 of the odd-numbered PCB layers 11 and 13 are provided with start portions S1 and S3 on the inner side and end portions E1 and E3 on the outer side and the second coil pattern 22 of the even-numbered PCB layer 12 is provided with a start portion S2 on the outer side, and an end portion E2 on the inner side.

The stacking-type stator according to the second embodiment is formed by winding the coil patterns 21 to 23 of the first to third PCB layers 11 to 13 in a helical shape in a clockwise (CW) direction, and then interconnecting the coil patterns 21 to 23 via the throughholes T11 through T18, in which fourth jumper wire patterns J11 and J12 are formed on the third PCB layer 14 in order to connect the fourth and fifth coil patterns 24 and 25 of the fourth PCB layer 14 and a fifth jumper wire pattern J13 is formed on the fourth PCB layer 14.

In addition, since the first to third coil patterns 21 to 23 are disposed at the same position and in the same shape in the stacking-type stator according to the second embodiment of the present invention, it is possible to secure a wider space for disposing the throughholes used for interconnecting the coil patterns of the respective PCB layers in comparison with the first embodiment.

The remaining portions except the region where the fourth coil pattern 24 and the fifth coil pattern 25 overlap in the first to third coil patterns 21 to 23 are the throughhole regions R11 to R16 where the eleventh to eighteenth throughholes T11 to T18 can be arranged.

That is, when viewed from the first PCB layer 11 as a reference, some of the left and right recesses and inner regions of the upper protruding portions of the first to third coil patterns 21 to 23, and some of the inner regions and the recesses of the lower protruding portion thereof, correspond to the throughhole regions R11 to R16.

The eleventh to eighteenth throughholes T11 to T18 are disposed in the throughhole regions R11 to R16 and the first to fifth coil patterns 13 to 14 are connected by using the third to fifth jumper wire patterns J11 to J13, to thereby form one stator coil.

That is, the first coil pattern 21 of the first PCB layer 11 is wound in the clockwise direction in the start portion S1, and then the end portion E1 is connected to the start portion S2 of the second coil pattern 22 of the second PCB layer 22 of the third PCB 13 via the twelfth throughhole T12, and the end portion E2 of the second coil pattern 22 is connected to the start portion S3 of the third coil pattern 23 of the third PCB layer 13 via the seventeenth throughhole T17.

In addition, the end portion E3 of the third coil pattern 23 is connected to the start portion S4 of the fourth coil pattern 24 of the fourth PCB layer 14 via the eleventh throughhole T11, and the end portion E4 of the fourth coil pattern 24 and the start portion S5 of the fifth coil pattern 25 are interconnected through the third to fifth jumper wire patterns J11 to J13.

As a result, one end of the stator coil, that is, the end portion E5 of the fifth coil pattern 25 is connected to the first output terminal Out1 of the motor drive circuit 30 and the other end of the stator coil, that is, the start portion S1 of the first coil pattern 21 is connected to the second output terminal Out2 of the motor drive circuit 30 via the eighteenth throughhole T18.

In the stacking-type stator according to the second embodiment of the present invention, a part of the motor drive circuit 30 mounted on the fourth PCB layer 14 is disposed on the left side and another part of the motor drive circuit 30 is disposed dispersedly on the right side.

When the drive power source Vcc is supplied to the motor drive circuit 30 of the fourth PCB layer 14, the stacking-type stator according to the second embodiment rotates the opposed rotor as in the first embodiment.

That is, in the stacking-type stator according to the second embodiment, the six radial direction pattern portions of the first to third coil patterns 21 to 23 of the first to third PCB layers 11 to 13 are arranged at the same position, and the stacked coil patterns have positions opposite to the magnets of the rotor at the same time. Accordingly, when the drive power supply Vcc is supplied, the flow directions of the currents are set in the same direction, between the patterns of the coils stacked in the same position and thus the resultant torque can be generated.

Meanwhile, in the single-phase motor using the stacking-type stator according to an embodiment of the present invention, one Hall sensor H1 for rotor position detection is disposed on the PCB layer forming the stator, and a dead point prevention yoke made of iron plate or silicon steel can be adopted as a self-starting scheme. When the dead point prevention yoke is used, the initial position of the rotor can be set to stop at a predetermined position. If the Hall sensor is installed at a position where the dead point can be prevented in consideration of the initial position of the rotor, self-starting disabled phenomenon can be prevented.

FIG. 8 is an explanatory view for explaining the arrangement relationship of a dead point prevention yoke for self-starting and a Hall sensor in a single-phase motor according to the present invention.

Figure 17:
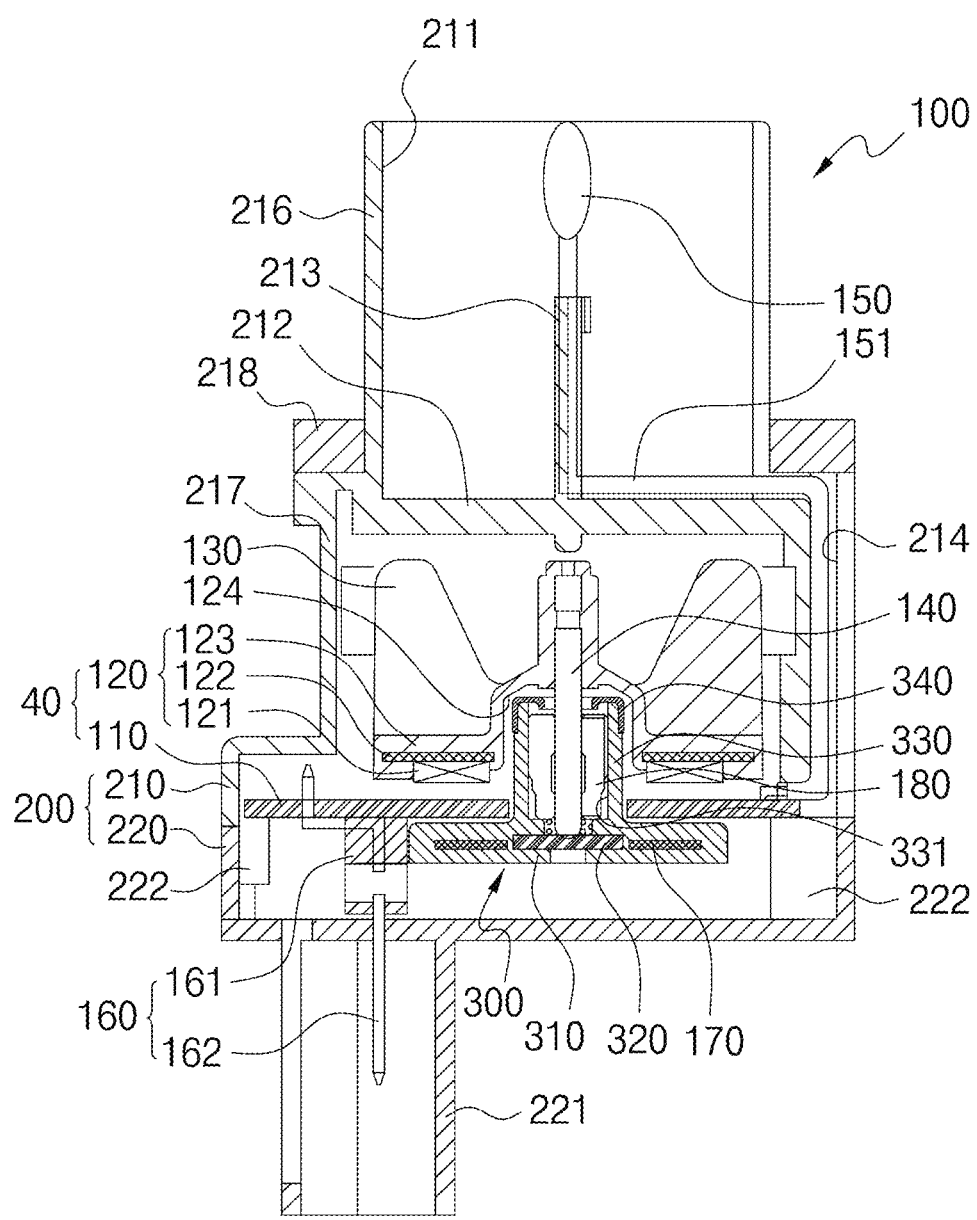
FIGS. 17 and 18 are axial sectional views showing a slim-type in-car sensor implemented using the slim-type single phase motor of the present disclosure.
Figure 18:
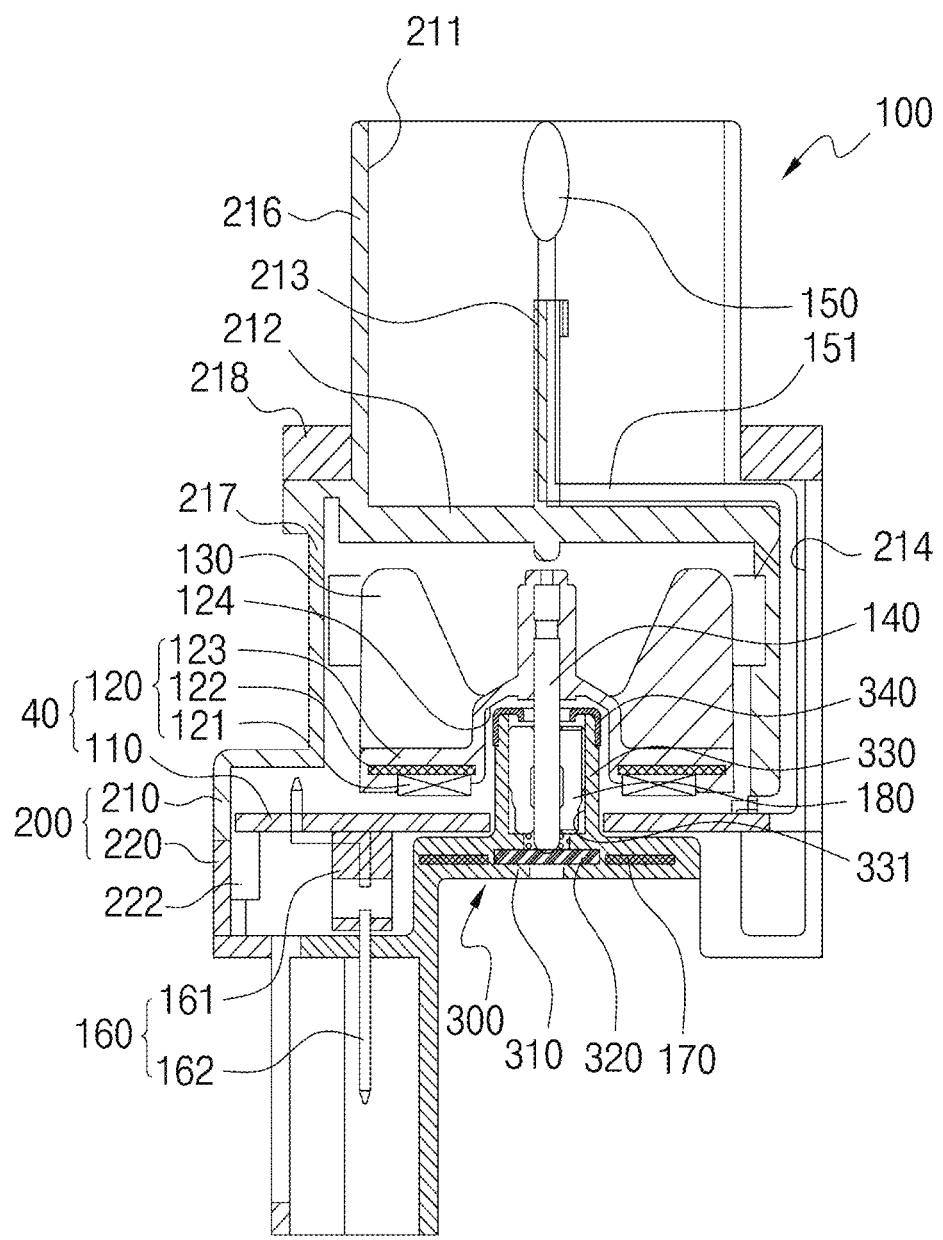

As in the case of the in-car sensor shown in FIGS. 17 and 18, in the present invention, when employing one Hall sensor and employing a dead point prevention yoke disposed at the lower side of the stator, the dead point prevention yoke 170 includes a flat plate the outer circumferential surface of which has a hexagonal shape, and the inner circumferential surface of the penetration opening has a circular shape, in the same number as the number of poles of the rotor (six poles).

The dead point prevention yoke 170 preferably uses a soft magnetic material having a low coercive force such as silicon steel or pure iron so as to serve as a yoke.

In this case, when the rotor 120 is in an initial state, the center of each magnet is positioned opposite to the widest point (i.e., the edge) of the effective area of the dead point prevention yoke 170 by the magnetic phenomenon between the magnet 121 of the rotor 120 and the dead point prevention yoke 170, as shown in FIG. 8.

Therefore, it is preferable that the Hall sensor H1 is disposed at a position shifted from the interface 121g of the magnetic pole by a ¼ magnetic pole width (15° in the case of a six magnetic pole rotor) or by a ¾ magnetic pole width. The reason why the Hall sensor H1 is disposed at a position shifted by ¼ magnetic pole width from the interface of the magnetic pole is that the magnetic flux generated from the magnet at this point is maximum, and thus the rotor position detection signal of the best sensitivity can be generated by the Hall sensor H1.

Further, in some embodiments of the present invention, the Hall sensor H1 is arranged at a point shifted by ¼ magnetic pole width from the interface 121g of the magnetic pole in the first to third coil patterns 21 to 23 of the stator, and one of the radial direction pattern portions 20g to 20l is positioned at the same point as the above.

As shown in FIG. 8, when one of the radial direction pattern portions 20g to 20l, for example, the radial direction pattern portion 20l coincides with the Hall sensor H1, and the drive power is applied to the motor drive circuit to start the rotor, at a state where the Hall sensor H1 is arranged at a point shifted by ¼ magnetic pole width from the interface 121g of the magnetic pole, the rotor position detection signal with the best sensitivity can be obtained from the Hall sensor H1, and the radial direction pattern portion 20l is opposed to the point where the magnetic flux generated from the magnet 121f is at the maximum, to thereby perform the self-starting operation more easily.

In addition, in the case where the rotating direction of the rotor is counterclockwise (CCW), it is preferable that the Hall sensor H1 is provided at a ¼ magnetic pole width position in the counterclockwise direction from the hexagonal corner of the dead point prevention yoke 170 and in the case where the rotating direction thereof is the clockwise (CW), the Hall sensor H1 is installed at the ¼ magnetic pole width position in the clockwise direction from the hexagonal corner of the dead point prevention yoke 170 to thereby avoid the self-starting disabled phenomenon.

Figure 9:
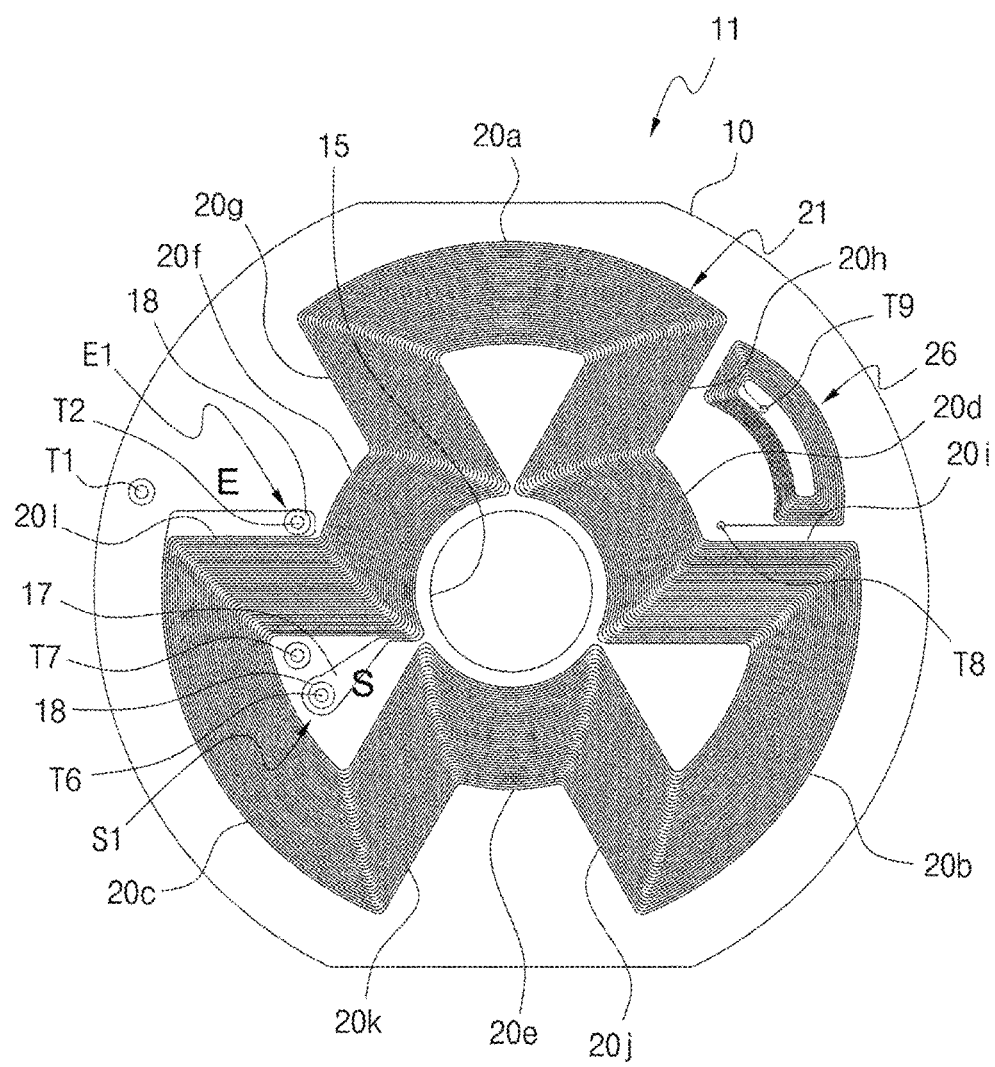
FIG. 9 is a pattern diagram of a first PCB layer of a multi-layered PCB in which a sensing coil necessary to implement a sensorless motor drive circuit according to the present disclosure is arranged together with a coil pattern.

Meanwhile, FIG. 9 shows a modification where the sensing coil pattern 26 for detecting the position of the rotor is formed in the first PCB layer 11 disposed together with the coil pattern 21 in order to implement a sensorless motor drive circuit according to an embodiment of the present invention.

The sensing coil pattern 26 should be selected from three recesses located between the three protrusions forming a space which is not overlapped with the first coil pattern 21 of the first PCB layer 11, that is, a star shape, and a pair of throughholes T8 and T9 for drawing both ends of the sensing coil pattern 26 to the fourth PCB layer 14 should be disposed in a space that does not overlap with the first to fifth coil patterns 21 to 25, and the connection relationship with the motor drive circuit 30 formed on the fourth PCB layer 14 needs to be considered.

The sensing coil pattern 26 according to the embodiment of the present invention is disposed in the recesses of the first PCB layer 11 in consideration of the above matters and is formed of a conductive pattern having a fan shape as a whole and having a helical shape in the clockwise (CW) direction from the inside to the outside.

In this case, the sensing coil pattern 26 constituting the sensing coil Ls is disposed on the first PCB layer 11 of the stator 110 and preferably the center of the sensing coil pattern 26 is disposed at a position shifted by ¼ magnetic pole width from the interface 121g of the magnetic pole.

The reason why the sensing coil pattern 26 is disposed at this position is that, when the initial state of the rotor 120 is taken into account, this point avoids the dead point and the magnetic flux generated from the magnet 121 is the maximum, and thus the sensing coil pattern 26 can generate the rotor position detection signal with the best sensitivity.

In other words, considering the initial state of the rotor 120, the sensing coil pattern 26 is installed in the stator 110 at a position shifted by a ¼ magnetic pole width (15° in the case of a six pole rotor) from the interface 121g of the magnetic pole or by a ¼ magnetic pole width (15° in the case of a six pole rotor) from the center of the magnetic pole.

As descried above, when the sensing coil pattern 26 is installed at a position shifted by a ¼ magnetic pole width (15 degrees in the case of a six pole rotor) from the interface 121g of the magnetic pole, or by ¼ magnetic pole width (15 degrees in the case of a six pole rotor), from the center of the magnetic pole, and in the case that the drive power is applied to the motor drive circuit and thus the rotor is started, the sensing coil pattern 26 is opposed to a point where the sensing coil pattern 26 moves away from the magnetic pole interface (i.e., the neutral point) of the rotor and the magnetic flux generated from the magnet 121b is the maximum, to thereby easily perform self-starting of the rotor.

That is, when the rotor is in an initial state, and in the case that the sensing coil pattern 26 is positioned at a position shifted from the magnetic pole interface 121g of the rotor positioned by the dead point prevention yoke 170 and is placed at the position where the sensing coil pattern 26 is overlapped with one of the radial direction pattern portions, since the magnetic flux generated from the magnets is the maximum, the sensing coil pattern 26 can generate the rotor position detection signal with the best sensitivity, and since one of the radial direction pattern portions is overlapped at the rotor position generating the maximum magnetic flux and the largest magnetic field interacts with the maximum magnetic flux, the stator has the optimal conditions necessary to start the rotor.

As shown in FIG. 9, when the sensing coil pattern 26 is formed on the first PCB layer 11 facing the rotor, the magnet approaches the sensing coil pattern 26 during rotation of the rotor, and then an induced electromotive force is generated from the sensing coil pattern 26 by electromagnetic induction. In addition, the motor drive circuit 30 changes the direction of the current flowing in the stator coil by turning on the switching device by using the induced electromotive force.

In some embodiments of the present invention, it is possible to form the coil pattern for the stator coil by patterning the copper foil of the PCB substrate by a batch process as shown in FIG. 9, and at the same time to form the sensing coil 26, which does not cause an increase in manufacturing cost.

Figure 10:
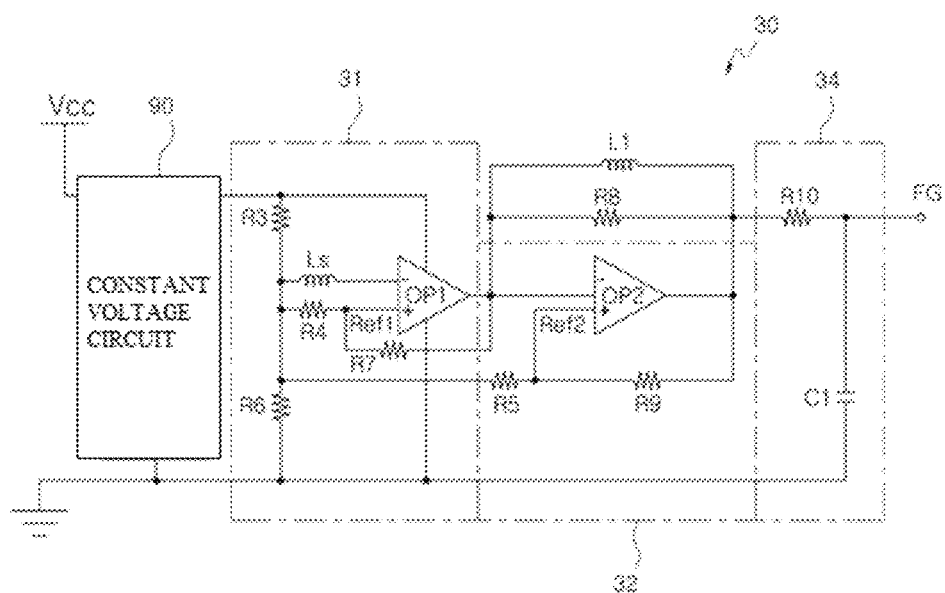
FIG. 10 is a circuit diagram of a sensorless motor drive circuit for driving a sensorless single-phase motor according to the present disclosure.

Hereinbelow, referring to FIG. 10, a sensorless motor drive circuit for driving a sensorless single-phase motor according to the present invention will be described.

When the external power supply Vcc is applied to one side of the sensorless motor drive circuit 30, a constant voltage circuit 90 for generating a constant drive power supply Vdd provided to a downstream comparator is connected to the sensorless motor drive circuit 30.

The sensorless motor drive circuit 30 includes: a rotor position signal generating unit 31 including a first comparator OP1 configured by using an operational amplifier and which is configured to receive a rotor position signal in which a high level H and a low level L are repeated periodically in accordance with the rotation of the rotor; and a switching circuit 32 including a second comparator OP2 configured by using an operational amplifier and which is configured to switch the direction of the current flowing to the stator coil L1 according to the output level of the rotor position signal input from the rotor position signal generator 31.

In the rotor position signal generator 31, a voltage dividing circuit formed by resistors R3 and R6 is connected in parallel between an output terminal of the constant voltage circuit 90 and the ground, and a constant first reference voltage Vref1 is applied to a non-inverting input terminal (+) of the first comparator OP1 through a resistor R4 from a connection node between the resistors R3 and R6, while an induced electromotive force induced to the sensing coil Ls due to the first reference voltage Vref1 is added and applied to an inverting input terminal (−) via the sensing coil Ls for the rotor position detection constituted by the sensing coil pattern 26 shown in FIG. 9 from the connection node between the resistors R3 and R6.

A resistor R7 connected between the non-inverting input terminal (+) and the output terminal of the first comparator OP1 is used for positive feedback of the output of the first comparator OP1. The output of the first comparator OP1 is output in a square wave form.

In the switching circuit 32, a rotor position signal generated from the rotor position signal generator 31 is applied to an inverting input terminal (−) of the second comparator OP2 and a constant second reference voltage Vref2 is applied to a non-inverting input terminal (+) of the second comparator OP2 via a resistor R5 from the connection node between the resistors R3 and R6. A resistor R9 connected between the non-inverting input terminal (+) and the output terminal of the second comparator OP2 is used for positive feedback of the output of the second comparator OP2. The output of the second comparator OP2 is output in a square wave form.

A stator coil L1 constituted by the first to fifth coil patterns 21 to 25 and a resistor R8 are connected in parallel between the output terminal of the switching circuit 32 and the inverting input terminal (−) of the second comparator OP2.

In addition, the output of the second comparator OP2 is connected to a frequency generator (FG) signal output unit 34. The FG signal output unit 34 is provided with an FG signal output terminal for receiving the feedback of the motor speed through a resistor so as to be used for controlling the speed of the motor. A reference number C1 is used for bypassing the high frequency noise contained in the FG signal.

Since the sensing coil pattern 26 is disposed in the first PCB layer 11 of the stator 110, in the embodiment constructed above, the rotor 40, in which the N-pole and the S-pole magnets are arranged alternately, rotates. When the rotor 120 faces the N-pole magnet, an induced electromotive force (that is, a back electromotive force (back EMF)) is generated in accordance with electromagnetic induction from the sensing coil Ls and the direction of the current flowing along the sensing coil Ls is determined by the Ampere's right-hand rule.

Here, a change in a magnetic force line (or a magnetic field intensity) applied to the sensing coil Ls is generated in the form of a sinusoidal wave according to the rotation of the opposing N-pole magnet, and thus the induced electromotive force induced in the sensing coil Ls is also changed in a sinusoidal wave form with a change in the magnetic force line and with a phase difference of ¼ (90 degrees).

Therefore, the induced electromotive force induced in the sensing coil Ls is added to the first reference voltage Vref1 and input to the inverting input terminal (−) of the first comparator OP1.

Accordingly, since the voltage of the inverting input terminal (−) becomes larger than the first reference voltage Vref1 applied to the non-inverting input terminal (+) in the first comparator OP1, a rotor position signal of the low level L is generated from the output of the first comparator OP1.

Therefore, since the second reference voltage Vref2 applied to the non-inverting input terminal (+) is larger than the rotor position signal of the low level L applied to the inverting input terminal (−) in the second comparator OP2, the output of the second comparator OP2 becomes the high level H. Therefore, the current flows from the output side of the second comparator OP2 to the inverted input terminal (−) of the second comparator OP2 in the stator coil L1.

Thereafter, when the rotor continues to rotate and faces the S-pole magnet, an induced electromotive force (that is, a back electromotive force (back EMF)) is generated from the sensing coil Ls by electromagnetic induction, and the direction of the current flow is determined as opposed to the case where the rotor faces the N-pole magnet by the Ampere's right hand rule.

Here, a change in a magnetic force line (or a magnetic field intensity) applied to the sensing coil Ls is generated in the form of a sinusoidal wave according to the rotation of the opposing S-pole magnet, and thus the induced electromotive force induced in the sensing coil Ls is also changed in a sinusoidal wave form with a change in the magnetic force line and with a phase difference of ¼ (90 degrees).

Therefore, the induced electromotive force induced in the sensing coil Ls is subtracted from the first reference voltage Vref1 and input to the inverting input terminal (−) of the first comparator OP1.

Accordingly, since the voltage of the inverting input terminal (−) becomes smaller than the first reference voltage Vref1 applied to the non-inverting input terminal (+) in the first comparator OP1, a rotor position signal of the high level H is generated from the output of the first comparator OP1.

Therefore, since the second reference voltage Vref2 applied to the non-inverting input terminal (+) is smaller than the rotor position signal of the high level H applied to the inverting input terminal (−) in the second comparator OP2, the output of the second comparator OP2 becomes the low level H. Therefore, the current flows to the output side of the second comparator OP2 from the inverting input terminal (−) of the second comparator OP2 in the stator coil L1.

As described above, in some embodiments, since the direction of the current flowing in the stator coil L1 is periodically switched by the induced electromotive force (that is, the back electromotive force (back EMF)) induced in the sensing coil Ls, it is possible to periodically switch the direction of the current flowing from the motor drive circuit 30 to the stator coil L1 without using an expensive rotor position detection sensor such as a Hall sensor. As a result, the rotor continues to rotate in the same direction as the rotating direction.

The sensorless single-phase motor 40 using the sensing coil Ls cannot be rotationally driven in advance to rotate the rotor predeterminedly in either the clockwise (CW) direction or the counterclockwise (CCW) direction, differently from the case of using the Hall sensor.

Therefore, in some embodiments of the present invention, when the rotor is rotated in either the clockwise (CW) direction or the counterclockwise (CCW) direction after the rotor is started in the initial state, the rotor continues to rotate in the direction in which the rotor rotates by periodically changing the flow direction of the current to the stator coil L1, every time the polarity of the rotor is changed.

When the current flows, since the outer and inner connection pattern portions 20a to 20c and 20d to 20f of the first to fifth coil patterns 21 to 25 are arranged in a substantially concentric circle shape, the force (F) generated by the Fleming's left-hand rule is oriented in the radial direction and thus does not affect the torque generation.

Therefore, the outer and inner connection pattern portions 20a to 20c and 20d to 20f of the first to fifth coil patterns 21 to 25 serve only as a path through which current flows, and a force is generated in the tangential direction from the six radial direction pattern portions 20g to 20f, to rotate the rotor 120.

Further, the directions of the currents flowing in the coils between the adjacent radial direction pattern portions 20g to 20l are set opposite to each other, and the magnetic poles of the corresponding magnets of the rotor 120 are also reversely positioned. Thus, the force pushing or pulling the magnets of the rotor in the same direction is generated to thereby rotate the rotor counterclockwise (CCW).

Further, the rotor position signal generator 31 of the motor drive circuit 30 detects the magnetic pole of the rotor every time the rotor 120 rotates by a mechanical angle of 60° (an electrical angle of 180°) and generates the rotor position detection signals of the low level L and the high level H alternately. Accordingly, the switching circuit 32 changes the current flow direction of the driving current to the first to fifth coil patterns 21 to 25.

Hereinafter, in comparison with of the stacking-type stator according to the first and second embodiments, the structure of the stacking-type stator according to the third embodiment will be described in which the stator coil is minimized in resistance to reduce the phase resistance and the coil loss, thereby lowering the coil temperature and increasing the efficiency.

Referring to FIGS. 11 to 14, the stacking-type stator 110 according to the third embodiment of the present invention has the same basic structure as those of the stacking-type stators according to the first and second embodiments described above, and the former has the difference from the latter in view of a plurality of coil patterns 21 to 25.

Therefore, in the third embodiment, the same components as those in the first and second embodiment are denoted by the same reference numerals, and a detailed description thereof will be omitted.

The stacking-type stator 110 according to the third embodiment includes: a multi-layered printed circuit board (PCB) 10 in which a plurality of PCB layers are stacked and integrated and made of an insulating material; a plurality of coil patterns 21 to 25 made of helical conductive patterns obtained by patterning a copper foil stacked on the respective PCB layers so as to form a plurality of turns necessary for constructing a stator coil; and a plurality of throughholes T21 to T27 plated onto penetration holes formed to penetrate the multi-layered PCB 10 to connect the plurality of coil patterns 21 to 25 and the like.

The plurality of coil patterns 21 to 25 are patterned so as to have a helical shape. The plurality of coil patterns 21 to 25 are annularly arranged on a circular substrate so as to have a plurality of, for example, three protrusions and recesses alternately at intervals of 120 degrees.

As a result, the plurality of coil patterns 21 to 25 include: a plurality of inner and outer connection pattern portions 20*a*-20*f* arranged in a circumferential direction at intervals between the inner circumference and the outer circumference, respectively, in a curved shape; and a plurality of radial direction pattern portions 20*g*-20*l* which are arranged along the radial direction from the center and interconnecting the adjacent outer connecting pattern portions 20*a*-20*c* and the inner connecting pattern portions 20*d*-20*f*.

The stacking-type stator 110 may be constructed by using a multi-layered substrate 10*a* made of a copper clad laminate (CCL) in which copper foils are stacked on the respective layer substrate 10. The copper foil of each layer substrate is patterned and laminated, thereby forming conductive throughholes T21 to T27.

In the following description of the third embodiment, as shown in FIG. 12, the multi-layered substrate 10*a* is formed by stacking first to fourth PCB layers 11 to 14 having a four-layer structure as an example.

The first to third PCB layers 11 to 13 are respectively provided with first to third coil patterns 21 to 23 which are annularly arranged on the circular substrate so as to alternately have three protrusions and three recesses at intervals of 120 degrees on the upper surface of the substrate 10, and which are coiled in a helical form, and the lowermost fourth PCB layer 14 is provided with, for example, fan-shaped fourth and fifth coil patterns 24 and 25 which are vertically separated and formed, and which is formed by patterning, for example, a conductive metal such as copper (Cu).

Each of the first to third coil patterns 21 to 23 is formed so as to have a helical shape in a clockwise (CW) direction from the inside to the outside, the fourth coil pattern 24 is formed in a counterclockwise (CCW) direction from the inside to the outside, and the fifth coil pattern 25 is formed to have a helical shape in a clockwise (CW) direction from the outside to the inside.

Each of the first to third coil patterns 21 to 23 includes three outer and inner connection pattern portions 20*a* to 20*c* and 20*d* to 20*f* and six radial direction pattern portions 20*g* to 20*l* connecting the three outer coil connection pattern portions 20*a* to 20*c* and the three inner connection pattern portions 20*d* to 20*f*, which are alternately connected to form a zigzag shape as a whole.

In addition, the outer and inner connection pattern portions 20*a* to 20*c* and 20*d* to 20*f* are arranged along the circumferential direction with an interval between the outer circumference and the inner circumference, respectively, and each of the six radial direction pattern portions 20*g* to 20*l* is set in a direction which radiates from the center of the substrate as a whole such that the inner ends thereof have a pattern shape in which the interval between every two inner ends is narrower.

In the third embodiment, the first to third coil patterns 21 to 23 are composed of helical coils of 24 turns 401 to 424, respectively, as shown in FIG. 13. In this case, the radial direction pattern portions 20*g* to 20*l* of the first to third coil patterns 21 to 23 generate torque by maintaining the preset 24 reference turns 401 to 424, respectively, and the connection pattern portions 20*a* to 20*c* and 20*d* to 20*f* form twelve integrated turns 431 to 442 having a wide width by integrating (that is, short-circuiting) twenty-four reference turns 401 to 424, for example, two by two.

The number of the reference turns 401 to 424 integrated in the connection pattern portions 20*a* to 20*c* and 20*d* to 20*f* may be two to three, or the total number of reference turns 401 to 424 may be integrated as in the fourth embodiment.

In general, the resistance R is proportional to the length 1 and inversely proportional to the cross-sectional area S. Therefore, when the widths of the integration turns 431 to 442 are twice the reference turns 401 to 424, that is, when the integrated turns 431 to 442 have a ½ resistance value, and in the case that the 24 reference turns 401 to 424 of the connection pattern portions 20*a* to 20*c* and 20*d* to 20*f* are integrated two by two to form twelve integrated turns 431 to 442, the total resistance of the stator coil composed of the first to third coil patterns 21 to 23 is reduced to about ¼ as compared with before integration.

A copper loss or coil loss P is a phenomenon that occurs when energy ($P=I^2R$) is generated as heat when a current (I) flows through a conductor having a resistance RΩ, and energy loss causes a rise in temperature.

In the present invention, it is possible to greatly reduce the resistance and the copper loss, thereby reducing the energy loss, thereby lowering the coil temperature, and consequently increasing the motor efficiency.

In the present invention, when the first to third PCB layers 11 to 13 are stacked, the six radial direction pattern portions 20*g* to 20*l* in the first to third coil patterns 21 to 23 are all arranged at the same position. Therefore, as will be described later, when three PCB layers are stacked, the radial direction pattern portions 20*g* to 20*l* have positions where the coil patterns stacked in three layers are opposed to the magnets of the rotor at the same time, and the flow direction of the current is set equal. As a result, the resultant torque can be generated.

The stator 110 according to an embodiment interconnects the first to fifth coil patterns 21 to 25 formed on the multi-layered substrate 10*a* to form a stator coil. The number of the radial direction pattern portions 20*g* to 20*l* in the stator coil has a value of any one of the same number as the number of rotor magnetic poles, one-half of the number of rotor magnetic poles, and two times of the number of rotor magnetic poles, and simultaneously an angle between the adjacent radial direction pattern portions from among the radial direction pattern portions 20*g* to 20*l* is set to a value of 360°/n where n may be any one of the same number, half the number, and two-times the number as the number of rotor magnetic poles.

Therefore, in the case of a stator having six radial direction pattern portions 20*g* to 20*l*, the angle between the adjacent radial direction pattern portions 20*g* to 20*l* is 60° and the number of the magnetic pole of the rotor, that is, the number of the N-pole magnets and the S-pole magnets have six poles, in which the rotor is coupled to a single-phase motor to rotate to form the single-phase motor.

The printed wiring 17 necessary for mounting and wiring various electronic components 16 is formed in the fourth PCB layer 14 in a conductive pattern so as to integrally form the driving circuit 30 necessary for driving the single-phase motor.

In addition, the fourth PCB layer 14 may be formed to include fourth and fifth coil patterns 24 and 25 to be added to the first to third coil patterns 21 to 23 by utilizing a space remaining after mounting the driving circuit component, and the fourth and fifth coil patterns 24 and 25 may be omitted depending on the torque value required to rotate the rotor.

The illustrated fourth PCB layer 14 is shown in a perspective view, and various patterns, i.e., the fourth and fifth coil patterns 24 and 25, and the printed wiring 17 and the electronic component 16 mounted thereon are located on the rear surface of the multi-layered substrate 10a.

The fourth coil pattern 24 is a fan-shaped pattern having a helical shape in a clockwise (CW) direction from the outside to the inside, and the fifth coil pattern 25 is a fan-shaped pattern having a helical shape in a counterclockwise (CCW) direction from the inside to the outside.

In the case where the first to fourth PCB layers 11 to 14 according to some embodiments of the present invention are stacked, the first to fifth coil patterns 21 to 25 are mutually connected in a serial method through the first to seventh throughholes T21 to T27 in the case of the third embodiment, and the connection pattern portions 20a to 20c and 20d to 20f are patterned to form twelve integrated turns 431 to 442 by integrating (that is, short-circuiting) twenty-four reference turns 401 to 424 two by two to thereby form one stator coil. The first to seventh throughholes T21 to T27 are plated or filled with a conductive material in the throughholes.

In the stator for a single-phase motor according to the present invention, the first to third PCB layers 11 to 13 form a coil pattern layer, in which first to third coil patterns 21 to 23 are formed on an upper surface of a substrate 10, and the fourth PCB layer 14 forms a drive circuit layer in which the motor drive circuit 30 is mounted.

In order to connect the fourth coil pattern 24 and the fifth coil pattern 25 which are separately formed on the upper and lower sides of the fourth PCB layer 14, a sixth jumper wire pattern J21 connecting the throughholes T23 and T24 is formed along the inner circumference of the third coil pattern 23, in the third PCB layer 13. A seventh jumper wire pattern J22 connecting the throughholes T25 and T26 is also formed in order to connect the internal start portion S5 from the outside of the fifth coil pattern 25, in the third PCB layer 13. An eighth jumper wire pattern J23 connecting the throughholes T24 and T25 is formed along the outer periphery of the fifth coil pattern 25 in the fourth PCB layer 14.

When the first to fourth PCB layers 11 to 14 according to an embodiment are stacked, the first to fifth coil patterns 21 to 25 are interconnected via the throughholes T21 to T27 and the sixth and eighth jumper wire patterns J21 and J23, to thereby form one stator coil.

That is, the end portion E1 of the first coil pattern 21 of the first PCB layer 11 is connected to the start portion S2 of the second coil pattern 22 of the second PCB layer 12 via the throughhole T22, and the end portion E2 of the second coil pattern 22 of the second PCB layer 12 is connected to the start portion S3 of the third coil pattern 23 of the third PCB layer 13 via the throughhole T27.

In addition, the end portion E3 of the third coil pattern 23 is connected to the start portion S3 of the fourth coil pattern 24 of the fourth PCB layer 14 via the throughhole T21, and the end portion E4 of the fourth coil pattern 24 and the start portion S5 of the fifth coil pattern 25 are mutually connected through the sixth jumper line pattern J21 connecting the throughhole T23 and the throughhole T24, an eighth jumper line pattern J23 connecting the throughhole T24 and the throughhole T25 and a seventh jumper line pattern J22 connecting the throughhole T25 and the throughhole T26.

As a result, one end of the stator coil, that is, the end portion of the fifth coil pattern 25 is connected to the first output terminal Out1 of the motor drive circuit 30 and the other end of the stator coil, that is, the start portion S1 of the first coil pattern 21 is connected to the second output terminal Out2 of the motor drive circuit via the throughhole T27.

In some embodiments of the present invention, the widths of the first to fifth coil patterns 21 to 23 are set to arrange the throughholes T21 to T27 so that there is an area where the coil patterns do not overlap with each other on the inner and outer circumferential portions of the outer connection pattern portions 20a to 20c of the first to third coil patterns 21 to 23.

As a result, in some embodiments of the present invention, the start or end terminal disposed inside the first inner fifth coil patterns 21 to 25 can be easily connected to the coil patterns of the other layers without using a separate wiring pattern PCB layer.

Although the motor drive circuit 30 for driving the single-phase motor is mounted on the fourth PCB layer 14 in the third embodiment shown in FIG. 12, the motor drive circuit may be separately formed. That is, when a sufficient space cannot be secured between the stator and the supporting portion on which the stator is mounted, only a minimum number of driving circuit components can be mounted on the rear surface of the fourth PCB layer 14.

Figure 14:
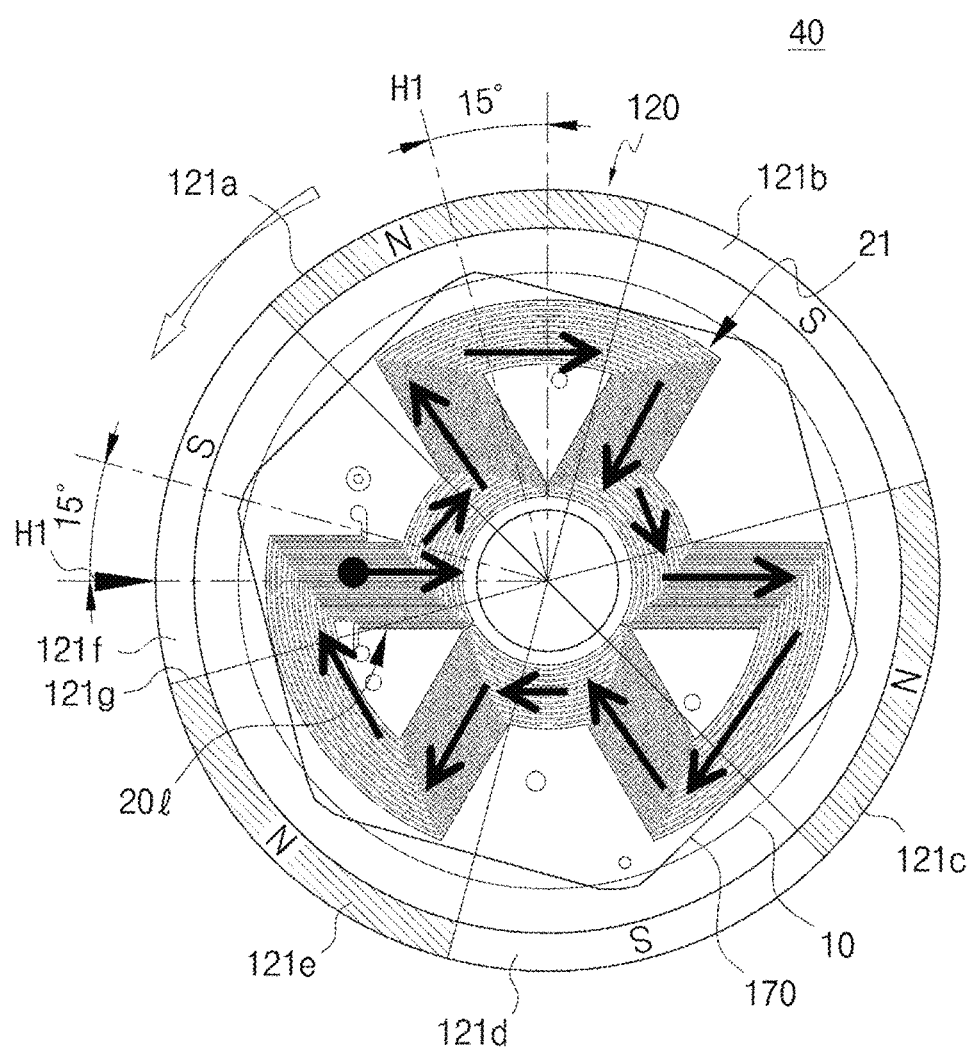
FIG. 14 is an explanatory view for explaining the arrangement relationship of a dead point prevention yoke for self-starting and a Hall sensor in a single-phase motor according to the present disclosure.

Hereinafter, a single-phase motor using the stacking-type stator according to the third embodiment of the present invention will be described with reference to FIG. 14. In FIG. 14, the current flow (refer to an arrow) for each rotational position of the rotor is the same as the current flows for the first coil pattern 21 of the first PCB layer 11 and the second to fifth coil patterns 22 to 25 of the second to fourth PCB layers 12-14 and thus only the first coil pattern 21 of the first PCB layer 11 will be described.

The single-phase motor 40 illustrated has a structure in which a stator 110 and a rotor 120 of a 6-slot-6-pole structure are arranged in an axial type so as to face each other, but the stator 110 and the rotor 120 of the 6-slot-6-pole structure are shown together on the same plane for convenience of explanation.

The motor drive circuit 30 for a single-phase motor detects the magnetic pole of the magnet from the Hall sensor H1, for example, and generates a pair of first rotor position detection signals of opposite polarities. In this case, one of the first and second switching transistors is turned on and the other thereof is turned off to determine the direction of current flow through the stator coil connected between the first and second switching transistors.

As shown in FIG. 14, in the illustrated third embodiment, the Hall sensor H1 is installed at a position deviated by 15 degrees from the interface 121g between the N-pole magnet 121e and the S-pole magnet 121f.

When the drive power source Vcc is supplied to the motor drive circuit 30 when the rotor 120 is at the initial position (i.e., 0 degree), the Hall sensor H1 recognizes the S-pole magnet 121f of the rotor 120 and generates a pair of first rotor position detection signals containing the rotation direction of the rotor (that is, the counterclockwise (CCW) direction) to then apply the first rotor position detection signals to both the first and second switching transistors of the motor drive circuit 30. In this case, the first switching transistor is turned on and the second switching transistor is turned off so that the direction of current flow of the driving current to the stator coil, that is, the first to fifth coil patterns 21 to 25, is determined.

The current flows in the direction from the start portion S1 of the first coil pattern 21 to the end portion of the fifth coil pattern 25 as the rotating direction of the rotor is determined as the counterclockwise (CCW) direction, and the direction of current flow is indicated by arrows in the first coil pattern 21. In addition, current flows in the second to fifth coil patterns 22 to 25 in the same direction as the first coil pattern 21.

In this case, since the outer and inner connection pattern portions 20a to 20c and 20d to 20f of the first to fifth coil patterns 21 to 25 are arranged in a substantially concentric circle shape, the force (F) generated by the Fleming's left-hand rule is directed in the radial direction and thus does not affect the rotating torque of the rotor.

The first to fifth coil patterns 21 through 25 are connected to each other via the throughholes T21 to T27 and the jumper wire patterns J1 to J23 so that the flow directions of the driving currents flowing through the radial direction pattern portions 20g to 20l at the same positions are the same. As a result, the radial direction pattern portions 20g to 20l are oriented in the radial direction (i.e., normal direction) perpendicular to the rotating direction (i.e., circumferential direction) of the rotor 120, and thus a tangential force F is generated in the counterclockwise (CCW) direction according to the Fleming's left-hand rule.

Therefore, the outer and inner connection pattern portions 20a to 20c and 20d to 20f of the first to fifth coil patterns 21 to 25 serve only as a path through which current flows, and a force F is generated in the tangential direction from the six radial direction pattern portions 20g to 20l, to rotate the rotor 120.

Further, the directions of the currents flowing in the coils between the adjacent radial direction pattern portions 20g to 20l are set opposite to each other, and the magnetic poles of the corresponding magnets of the rotor 120 are also reversely positioned. Thus, the force pushing or pulling the magnets of the rotor in the same direction is generated to thereby rotate the rotor counterclockwise (CCW).

As described above, in the single-phase motor using the stacking-type stator according to the third embodiment of the present invention, the radial direction pattern portions 20g to 20l are connected so that current flows in the same direction, and generates a tangential rotational force on the rotor in accordance with the current flow.

Then, when the rotor 120 rotates by a mechanical angle of 45° (an electrical angle 135°), the Hall sensor H1 is positioned on the interface 121g between the N-pole magnet 121a and the S-pole magnet 121f. Thus, the Hall sensor H1 does not recognize the magnetic poles and does not determine the direction of current flow.

When the rotor 120 continues to rotate by the rotation inertia to rotate at a mechanical angle of 60 degrees (an electrical angle 180 degrees) beyond a mechanical angle of 45 degrees (an electrical angle of 135 degrees) to the mechanical angle, the Hall sensor H1 recognizes N-pole magnets 121a. In this case, the Hall sensor H1 generates a pair of second rotor position signal outputs having the opposite polarity to the first rotor position signal and applies the generated pair of second rotor position signal outputs to first and second switching transistors, so that the first switching transistor is turned off and the second switching transistor is turned on and thus the current flow direction of the driving current to the stator coils, that is, the first to fifth coil patterns 21 to 25, is set to be opposite.

As a result, when the current flow directions of the driving currents for the first to fifth coil patterns 21 to 25 are reversed, the radial direction pattern portions 20g to 20l generate a tangential force F in the counterclockwise (CCW) direction in accordance with the Fleming's left-hand rule to thereby rotate the rotor 120.

As described above, the motor drive circuit 30 detects the magnetic pole of the rotor every time the Hall sensor H1 rotates by 60° in a mechanical angle (or by 180° in an electrical angle), and alternates between the first rotor position detection signal and the second rotor position detection signal. Accordingly, the first and second switching transistors are alternately turned on and off to change the directions of current flows of the driving currents to the first to fifth coil patterns 21 to 25.

As described above, in the stacking-type stator 110 according to the third embodiment of the present invention, the stator coil is implemented as a stacked type using the conductive pattern coils 21 to 25 formed on the multi-layered PCB, thereby improving the productivity and reducing the cost.

In addition, the stacking-type stator according to some embodiments of the present invention includes radially oriented radial direction pattern portions 20g to 20l so that the coil pattern of each layer can maximize the torque generation efficiency, and is designed so as to maximize the total area of the portions where the radial direction pattern portions 20g to 20l of the stator coil (winding) and the magnets 121a to 121f face each other when the rotor 120 rotates.

In this case, as shown in FIG. 17, when the magnets are formed into a ring shape, and the width of the ring is formed to be at least larger than the length of the radial direction pattern portions 20g to 20l, in order that the rotor 120 is arranged to face the radial direction pattern portions 20g to 20l, the total area of the portions where the radial direction pattern portions 20g to 20l and the magnets 121a to 121f face each other can be maximized, so that torque generation can be maximized.

FIG. 14 is an explanatory diagram for explaining the arrangement relationship between the dead point prevention yoke for self-starting and the Hall sensor in the single-phase motor using the stacking-type stator 110 according to the third embodiment.

As in the case of the in-car sensor shown in FIG. 17, in the present invention, when employing one Hall sensor and employing a dead point prevention yoke disposed at the lower side of the stator, the dead point prevention yoke 170 includes a flat plate the outer circumferential surface of which has a hexagonal shape, and the inner circumferential surface of the penetration opening has a circular shape, in the same number as the number of poles of the rotor 120 (six poles) as shown in FIG. 14.

In this case, when the rotor 120 is in an initial (stop) state, the center of each magnet is positioned opposite to the widest point (i.e., the edge) of the effective area of the dead point prevention yoke 170 by the magnetic phenomenon between the magnet 121 of the rotor 120 and the dead point prevention yoke 170, as shown in FIG. 14.

Therefore, it is preferable that the Hall sensor H1 is disposed at a position shifted from the interface 121g of the magnetic pole by a ¼ magnetic pole width (15° in the case of a six magnetic pole rotor) or by a ¾ magnetic pole width. The reason why the Hall sensor H1 is disposed at a position shifted by ¼ magnetic pole width from the interface 121g of the magnetic pole is that the magnetic flux generated from the magnet at this point is maximum, and thus the rotor position detection signal of the best sensitivity can be generated by the Hall sensor H1.

Further, in some embodiments of the present invention, the Hall sensor H1 is arranged at a point shifted by ¼ magnetic pole width from the interface 121g of the magnetic pole in the first to third coil patterns 21 to 23 of the stator, and one of the radial direction pattern portions 20g to 20l is positioned at the same point as the above.

As shown in FIG. 14, when one of the radial direction pattern portions 20g to 20l, for example, the radial direction pattern portion 20l coincides with the Hall sensor H1, and the drive power is applied to the motor drive circuit 30 to start the rotor, at a state where the Hall sensor H1 is arranged at a point shifted by ¼ magnetic pole width from the interface 121g of the magnetic pole, the rotor position detection signal with the best sensitivity can be obtained from the Hall sensor H1, and the radial direction pattern portion 20l is opposed to the point where the magnetic flux generated from the magnet 121f is at the maximum, to thereby perform the self-starting operation more easily.

In addition, in the case where the rotating direction of the rotor is counterclockwise (CCW), it is preferable that the Hall sensor H1 is provided at a ¼ magnetic pole width position in the counterclockwise direction from the hexagonal corner of the dead point prevention yoke 170 and in the case where the rotating direction thereof is the clockwise (CW), the Hall sensor H1 is installed at the ¼ magnetic pole width position in the clockwise direction from the hexagonal corner of the dead point prevention yoke 170 to thereby avoid the self-starting disabled phenomenon.

Hereinafter, a stacking-type stator according to a fourth embodiment of the present invention will be described with reference to FIG. 15.

Figure 11:
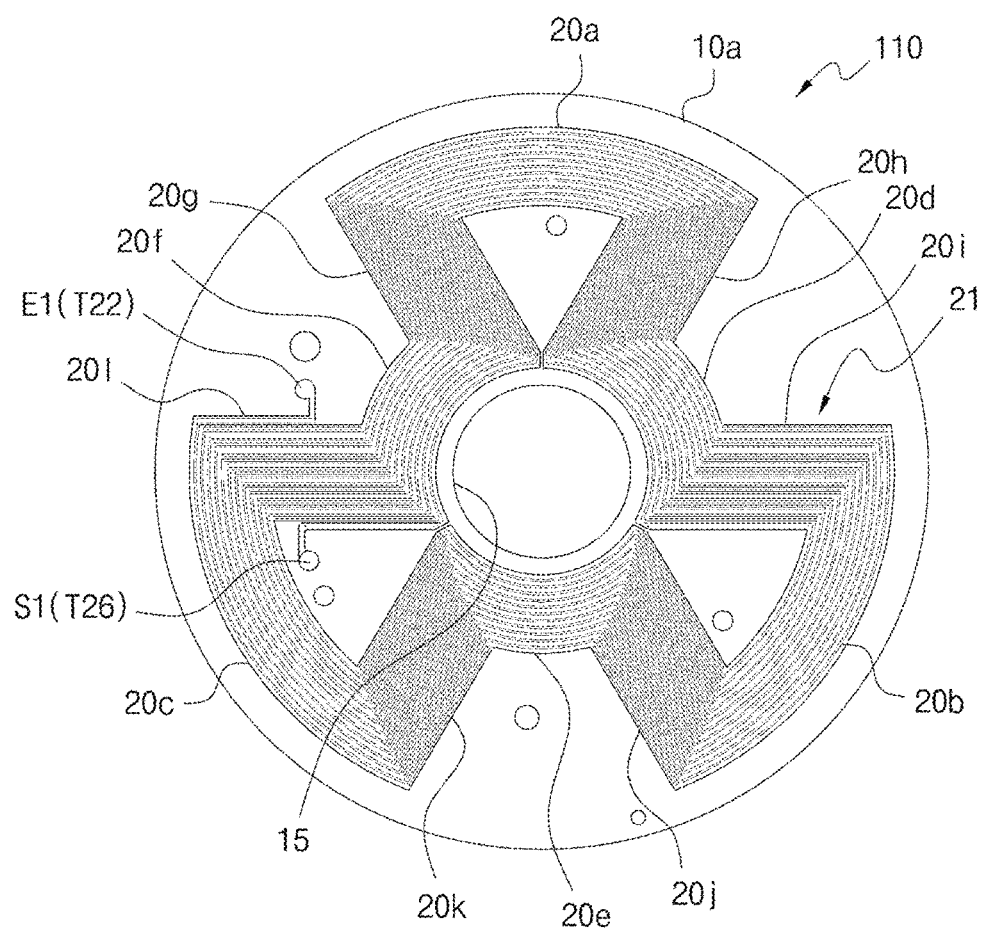
FIG. 11 is a plan view showing a stacking-type stator for a single-phase motor according to a third embodiment of the present disclosure.

First, in the stacking-type stator 110 according to the third embodiment of the present invention shown in FIGS. 11 and 12, the first to third coil patterns 21 to 23 are formed to have a helical shape in the clockwise (CW) direction, respectively, and the radial direction pattern portions 20g to 20l maintain the 24 reference turns 401 to 424 and the twenty-four (24) reference turns 401 to 424 of the connection pattern portions 20a to 20c and 20d to 20f are integrated two by two, to thus be designed into twelve (12) integrated turns 431 to 442.

In the stacking-type stator according to the fourth embodiment, the first to third coil patterns 21 to 23 of the fourth embodiment is the same as those of the third embodiment, except that the radial direction pattern portions 20g to 20l maintain 24 reference turns 401 to 424, and the twenty-four (24) reference turns 401 to 424 of the connection pattern portions 20a to 20c and 20d to 20f are all integrated into one.

When all of the 24 reference turns 401 to 424 of the connecting pattern portions 20a to 20c and 20d to 20f are integrated into one turn (450; 451) wider than the reference turns 401 to 424 by 4 to 6 times, as in the fourth embodiment, the total resistance of the stator coil constituted by the first to third coil patterns 21 to 23 is greatly reduced to ¼ or less as compared with before the integration.

As a result, the stacking-type stator according to the fourth embodiment significantly reduces the resistance and the copper loss by reducing the energy loss more than the third embodiment, so that the coil temperature can be lowered, and as a result, the motor efficiency can be increased.

Figure 15:
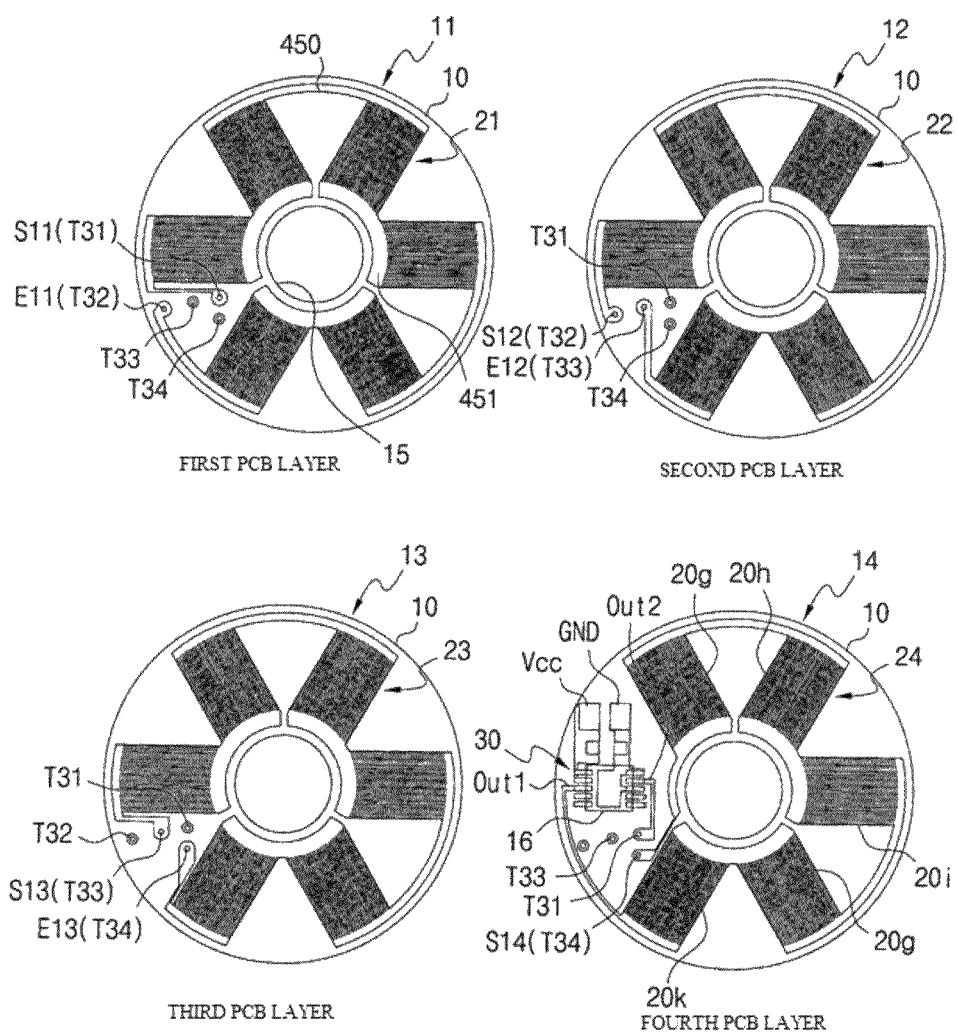
FIG. 15 shows development views showing coil patterns for respective PCB layers of a stacking-type stator for a single-phase motor according to a fourth embodiment of the present disclosure.

In the stacking-type stator according to the fourth embodiment, as shown in FIG. 15, all of the first to fourth coil patterns 21 to 24 are formed to have a helical shape in the clockwise (CW) direction, and only the fourth coil pattern 24 is formed of only five radial direction pattern portions 20g to 20k, one radial direction pattern portion 20l is omitted, and the motor drive circuit 30 is disposed in place of the radial direction pattern portion 20l.

In the fourth embodiment, the coil patterns 21 to 23 of the first to third PCB layers 11 to 13 are formed in the same shape patterns and have a helical shape in the clockwise (CW) direction. In this matter, the fourth embodiment is the same as the third embodiment.

The stacking-type stator according to the fourth embodiment is configured such that the coil patterns 21 to 24 of the first to fourth PCB layers 11 to 14 are formed into windings having a helical shape in the clockwise (CW) direction, and then are mutually connected via the four throughholes T31 to T34.

In addition, in the stacking-type stator according to the fourth embodiment of the present invention, the first to fourth coil patterns 21 to 24 are arranged at the same positions in the same shape, and when the first to fourth coil patterns 21 to 24 are connected via the throughholes T31 to T34, one stator coil is formed.

That is, after the first coil pattern 21 of the first PCB layer 11 is wound in the clockwise direction in the start portion S11 (i.e., via the throughhole T31), the end portion E11 thereof is connected to the start portion S12 of the second coil pattern 22 of the second PCB layer 12 via the throughhole T32, and the end portion E12 of the second coil pattern 22 is connected to the start portion S13 of the third coil pattern 23 of the third PCB layer 13 via the throughhole T33.

In addition, the end portion E13 of the third coil pattern 23 is connected to the start portion S14 of the fourth coil pattern 24 of the fourth PCB layer 14 via the throughhole T34, and the end portion of the fourth coil pattern 24 is connected to the extension wire.

As a result, one end of the stator coil, that is, the end portion of the fourth coil pattern 24 is connected to the first output terminal Out1 of the motor drive circuit 30 via the extension wire and the other end of the stator coil, that is, the start portion S11 of the first coil pattern 21 is connected to the second output terminal Out2 of the motor drive circuit 30 via the throughhole T31.

In the stacking-type stator according to the fourth embodiment of the present invention, the whole motor drive circuit 30 mounted on the fourth PCB 14 is disposed on the left side thereof.

When the drive power source Vcc is supplied to the motor drive circuit 30 of the fourth PCB layer 14, the stacking-type stator according to the fourth embodiment rotates the opposed rotor as in the first embodiment.

That is, in the stacking-type stator according to the fourth embodiment, the six radial direction pattern portions of the first to fourth coil patterns 21 to 24 of the first to fourth PCB layers 11 to 14 are arranged at the same position, and the stacked coil patterns have positions opposite to the magnets of the rotor at the same time. Accordingly, when the drive power supply Vcc is supplied, the flow directions of the currents are set in the same direction, between the patterns of the coils stacked in the same position and thus the resultant torque can be generated.

Meanwhile, when the sensing coil pattern 26 is formed on the first PCB layer 11 facing the rotor as shown in FIG. 9, and when the magnet comes close to the sensing coil pattern in the third and fourth embodiments, during rotating of the rotor, an induced electromotive force is generated from the sensing coil pattern by the electromagnetic induction, and the motor drive circuit 30 can change the direction of the current flowing through the stator coil by turning on the switching device by using the induced electromotive force.

Hereinafter, a slim-type single-phase motor and a slim-type in-car sensor implemented by using a stacking-type stator will be described with reference to FIGS. 16 to 18.

Figure 16:
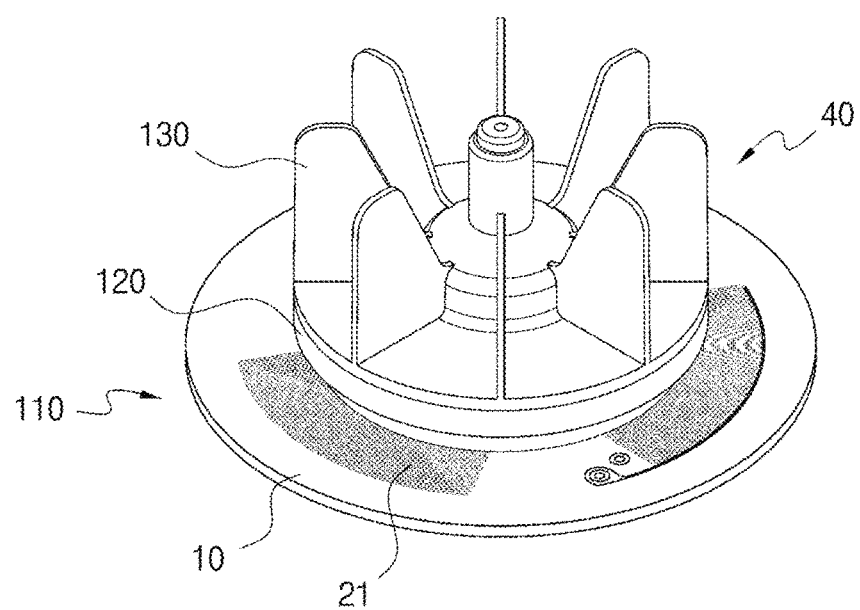
FIG. 16 is a perspective view showing a slim-type single-phase motor implemented using a stacking-type stator according to the present disclosure.

FIG. 16 shows a slim-type single-phase motor implemented using a stacking-type stator according to the present invention, and FIG. 17 shows a slim-type in-car sensor using a slim-type single-phase motor according to the present invention.

As shown in FIGS. 16 and 17, the slim-type in-car sensor 100 according to the present invention includes a single-phase motor implemented by using the stacking-type stator 110 according to the present invention accommodated in a cylindrical housing 200. The single-phase motor 40 constitutes an aspiration motor for an in-car sensor.

The housing 200 has an upper housing 210 having a cylindrical shape and a suction port 211 through which air is sucked in one side of the housing 200, and a lower housing 220 whose upper end portion is coupled to the lower portion of the upper housing 210 and which seals the lower portion thereof while forming a space therein.

In addition, the single-phase motor 40 also includes a stacking-type stator 110, a rotor 120, a rotating shaft 140, a sleeve bearing 180, and a bearing holder 300.

A step 222 for supporting the lower portion of the stacking-type stator 110 protrudes inside the lower housing 220, and a terminal guide 221 for receiving a terminal assembly 160 is extended to the lower portion of the lower housing 220.

The terminal assembly 160 includes: a plurality of terminal pins 162 for applying drive power Vcc or the like from a CCM (Climate Control Module) acting as an air conditioning control device in the vehicle to a motor drive circuit 30 integrally formed with the stacking-type stator 110 and receiving FG (Frequency Generator) signals; and a terminal support 161 for integrating the plurality of terminal pins 162.

The plurality of terminal pins 162 are integrated by the terminal support 161. The lower end portion of the terminal pin 162 is fixed to the lower housing 220 while extending into the terminal guide 221 and the upper end of the terminal pin 162 is electrically connected to the motor drive circuit 30 integrally formed with the stacking-type stator 110 and is physically fixed while penetrating the multi-layered substrate 10a. An external connector connected to the CCM is inserted into the terminal guide 221 and connected to the terminal pin 162.

A rotor 120 is disposed with a certain gap above an upper portion of the stacking-type stator 110 so as to face each other in an axial gap form, and a plurality of magnets 121 having N-poles and S-poles alternately arranged on the bottom face of the rotor 120 are arranged in an annular shape. An annular back yoke 122 is disposed on the top of the magnet 121 to form a magnetic circuit path, and the plurality of magnets 121 and the back yoke 122 are annularly integrated by a rotor support 123.

A plurality of blades protrude from the upper surface of the rotor support 123 to integrally form an impeller 130 and the upper end of the rotating shaft 140 is inserted into the center of the rotor support 123 to form a single body.

When the rotor 120 and the impeller 130 are integrally formed, the back yoke 122 and the magnets 121 are annularly arranged in the mold and the rotating shaft 140 is vertically disposed at the center and then the insert injection molding is performed. By doing so, while the rotor support 123 is molded, the back yoke 122, the magnets 121 and the rotating shaft 140 are integrally formed with the rotor support 123 and the impeller 130 is integrally formed on the upper surface of the rotor support 123 in the circumferential direction.

The center of the rotor support 123 is formed with a groove 124 upwardly in the bottom surface thereof and a cylindrical boss 330 having a groove 331 in the downward direction from the upper side is disposed in the groove 124 to protrude from the downside to the upside via a penetration opening 15 of the stacking-type stator 110 from the base plate 310 of the bearing holder 300, and to accommodate the sleeve bearing 180 at the center thereof.

The sleeve bearing 180 is inserted into the groove 331 of the cylindrical boss 330 and is press-coupled. The rotating shaft 140 is rotatably coupled to the penetration opening of the sleeve bearing 180.

In addition, a splash-proof oil cap 340 is coupled to the upper portion of the cylindrical boss 330 to prevent leakage of the oil filled in the groove 331 due to the rotation of the rotating shaft 140.

The base plate 310 of the bearing holder 300 is disposed in a direction perpendicular to the cylindrical boss 330 and a thrust plate 320 (or a bearing sheet) for supporting the rotating shaft 140 of the rotor 120 is formed at the center of the base plate 310, and a dead point prevention yoke 170 (see FIG. 8) is disposed outside the thrust plate 320.

The thrust plate 320 and the dead point prevention yoke 170 may be incorporated and integrated by an insert molding method when the base plate 310 and the boss 330 of the bearing holder 300 are injection molded.

A plurality of penetration openings are formed in the lower portion 217 of the upper housing 210 to discharge the air introduced through an inhale inlet 211 in the lateral direction and an impeller 130 integrally formed with the rotor 120 is disposed in the upper housing 210.

The upper housing 210 is provided with a bridge 212 for installing a temperature sensor 150 at an intermediate portion between the upper portion 216 and the lower portion 217. A temperature sensor guide 213 for guiding and supporting the temperature sensor 150 to the front end of the inhale inlet 211 is protruded at the center of the bridge 212.

One end of a lead wire 151 of the temperature sensor 150 is connected to a circuit portion formed in the stacking-type stator 110 and is led out to the upper portion 216 of the upper housing 210 through a penetration opening 214 formed in one side wall surface, and then extends along the bridge 212 and the temperature sensor guide 213 to the inhale inlet 211 so that the temperature sensor 150 is positioned at the inhale inlet 211.

The temperature sensor 150 can more accurately measure the temperature of the air introduced when the impeller 130 rotates together with the rotor 120 to thereby inhale air in the vehicle through the inhale inlet 211 of the upper housing 210, and the measured temperature value is transmitted to the CCM through the terminal pin 160 so as to be used for adjusting the indoor temperature of the vehicle.

The upper portion 216 of the upper housing 210 is smaller in diameter than the lower portion 217 and a cushion pad 218 is disposed at a boundary portion between the upper portion 216 and the lower portion 217, in which the cushion pad 218 blocks the noise generated by an operation of an aspiration motor 40 from entering a vehicle indoor room through an automobile grill or an instrument panel of a vehicle when the in-car sensor 100 is installed and used on the back surface of the automobile grill or the instrument panel, for example.

Referring to FIG. 18, a slim-type in-car sensor showing a modified embodiment according to an embodiment of the present invention is the same as the embodiment shown in FIG. 17 except for a part thereof. Accordingly, the same or like parts are denoted by the same or like reference numerals, and a detailed description thereof will be omitted.

The modified embodiment differs from the embodiment housing of FIG. 17 in that the lower housing 220a is formed integrally with the bearing holder 300 by injection molding.

The embodiment housing 200 of FIG. 17 has a space in which the lower housing 220 accommodates the bearing holder 300 and the terminal assembly 160 but the lower housing 220a of the modified embodiment of FIG. 18 has a space accommodating only a terminal assembly 160.

The embodiment of FIG. 18 is the same as that of FIG. 17, except that the number of parts to be managed is reduced by one.

When a current flows through the conductive pattern coils 21 to 25 by the motor drive circuit 30, the slim-type in-car sensor 100 according to the embodiment of the present invention rotates the impeller 130 together with the rotor 120, and inhales air inside the vehicle through the inhale inlet 211 of the housing 210.

Accordingly, the temperature sensor 150 accurately measures the temperature of the introduced air, and the measured temperature value is transmitted to the CCM through the terminal pin 160.

The in-car sensor 100 according to an embodiment of the present invention can realize a slim-type structure as compared with a conventional single-phase motor because the single-phase motor 40 uses the stacking-type stator 110.

In addition, since the stacking-type stator 110 can be manufactured at a time by a batch process, it is possible to manufacture a plurality of stacking-type stator 110 at a time, which is high in productivity and high in cost competitiveness, and since the stacking-type stator 110 can be incorporated with a motor drive circuit, there is an advantage that a separate control PCB can be reduced.

In addition, the stacking-type stator 110 according to some embodiments of the present invention includes the radial direction pattern portions 20g to 20l oriented in the radial direction so that the coil pattern of each layer can maximize the torque generation efficiency, and thus torque generation can be obtained at maximum. As a result, the inhale amount of the air inhaled from the inside of the vehicle is increased by the aspiration motor, so that more accurate temperature sensing can be achieved.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention can be applied to a stacking-type stator which can be implemented in a slim form by using a multi-layered printed circuit board (PCB) having coil patterns in which torque generation can be maximized in an opposite rotor, and a single-phase motor, an aspiration motor and an in-car sensor each using the same.

What is claimed is:

1. A stacking-type stator comprising:
a multi-layered substrate;
a plurality of coil patterns formed in a helical shape so as to form a plurality of turns on respective substrates of the multi-layered substrate and interconnected through conductive throughholes;
a Hall sensor disposed in the multi-layered substrate and disposed at a position deviated from an interface of a magnetic pole of a rotor when the rotor is in an initial state to thereby detect the magnetic pole of the rotor; and
a dead point prevention yoke for setting the position of the rotor such that the Hall sensor is positioned at a position deviated from the interface of the magnetic pole of the rotor when the rotor is in an initial state,
wherein the plurality of coil patterns include: a plurality of radial direction pattern portions each disposed along a radial direction to generate a torque to rotate the rotor; and a plurality of inner and outer connection pattern portions that interconnect the plurality of radial direction pattern portions and
the plurality of coil patterns form a stator coil for a single phase motor.

2. The stacking-type stator of claim 1, wherein the Hall sensor is positioned at a position deviated from the magnetic pole interface of the rotor positioned by the dead point prevention yoke when the rotor is in an initial state, and is disposed at a position overlapped with one of the radial direction pattern portions.

3. The stacking-type stator of claim 1, wherein the plurality of coil patterns has a pattern in which protrusions and recesses are repeated on an outer periphery of a penetration opening formed in a central portion of the multi-layered substrate.

4. The stacking-type stator of claim 1, wherein the multi-layered substrate comprises:
a plurality of substrates on which the plurality of coil patterns are respectively formed; and
a lowermost substrate on which a motor drive circuit for applying a driving current to the plurality of coil patterns is mounted.

5. An in-car sensor comprising:
a rotating shaft;
a rotor in which the rotating shaft is supported in a central portion of the rotor and a plurality of N-pole magnets and S-pole magnets are disposed alternately;
an impeller which is fixed to one end of the rotor and rotates with the rotor;
a bearing rotatably supporting the rotating shaft;
a bearing holder for receiving and fixing the bearing;
a stacking-type stator in which a penetration opening through which the bearing holder passes is formed at the center of the stacking-type stator;
a lower housing for supporting the stacking-type stator therein;
an upper housing disposed opposite to the lower housing and having a plurality of openings through which indoor air of a vehicle is inhaled from a front end portion of the impeller and the inhaled air is discharged into a portion facing the impeller, when the impeller is rotated; and
a temperature sensor arranged in an air flow path through which air is inhaled in the upper housing and measuring the temperature of the inhaled air, wherein
the stacking-type stator is the stator according to claim 1.

6. The in-car sensor of claim 5, further comprising a sensing coil pattern formed in one of the plurality of recesses of the plurality of coil pattern to detect the rotor rotational position.

7. The in-car sensor of claim 6, wherein the motor drive circuit comprises:
a rotor position signal generating unit for generating a rotor position signal corresponding to the rotor magnetic pole when the sensing coil formed by the sensing coil pattern generates an induced electromotive force corresponding to the magnetic pole of the opposite rotor; and a switching circuit for switching the direction of the driving current applied to the stator coil in correspondence to the rotor position signal generated from the rotor position signal generating unit in correspondence to the magnetic pole of the opposite rotor.

8. The in-car sensor of claim 6, wherein the sensing coil pattern is positioned at a position deviated by a ¼ magnetic pole width from the magnetic pole interface of the rotor positioned by the dead point prevention yoke or by ¼ magnetic pole width from the center of the magnetic pole, when the rotor is in an initial state.

9. The in-car sensor of claim 6, wherein the sensing coil pattern is positioned at a position deviated from the magnetic pole interface of the rotor positioned by the dead point prevention yoke when the rotor is in an initial state, and is disposed at a position overlapped with one of the radial direction pattern portions.

10. The in-car sensor of claim 5, wherein a sensing coil pattern formed on one of the plurality of recesses of the plurality of coil pattern for detecting the rotor rotational position is provided on the uppermost surface of the multi-layered substrate, and the motor drive circuit for applying the driving current to the plurality of coil pattern is provided on the lowermost surface of the multi-layered substrate.

11. The in-car sensor of claim 5, wherein the rotor is formed in a ring shape, and the width of the ring is formed to be larger than at least the length of the radial direction pattern portion, and the rotor is arranged to face the radial direction pattern portion.

12. The in-car sensor of claim 5, wherein the bearing holder comprises:

a base plate disposed at a lower portion of the stator, and having the dead point prevention yoke therein; and a boss protruding upward from the base plate through a penetration opening of the stacking-type stator and receiving and supporting the bearing at a central portion thereof, and wherein the base plate is integrally formed with the lower housing.

13. The in-car sensor of claim 5, wherein the plurality of inner and outer connection pattern portions are disposed along the circumferential direction at intervals in an inner circumference and an outer circumference which are concentrically arranged.

14. A stacking-type stator comprising:

a multi-layered substrate; and a plurality of coil patterns formed in a helical shape so as to form a plurality of reference turns on respective substrates of the multi-layered substrate and interconnected through throughholes, wherein the plurality of coil patterns comprise: a plurality of radial direction pattern portions each disposed along a radial direction to generate a torque to rotate the rotor; and a plurality of connection pattern portions that interconnect inner ends and outer ends of the adjacent radial direction pattern portions, and the plurality of connection pattern portions each have at least one integrated turn by integrating a plurality of reference turns by a plurality of reference turns.

15. The stacking-type stator of claim 14, wherein the integrated turn has a wider width than the reference turn.

16. The stacking-type stator of claim 14, wherein the integrated turn is formed by integrating two to three reference turns.

17. The stacking-type stator of claim 14, wherein the plurality of connection pattern portions each are formed of one integrated turn.

18. The stacking-type stator of claim 14, wherein the coil patterns each have a zigzag pattern in which protrusions and recesses are repeated on an outer periphery of a penetration opening formed in a central portion of the multi-layered substrate.

19. The stacking-type stator of claim 14, further comprising a jumper wire for interconnecting the plurality of coil patterns formed on each substrate of the multi-layered substrate.

20. The stacking-type stator of claim 14, wherein the number of the radial direction pattern portions is set to any one of the same number, half the number, and two-times the number as the number of rotor magnetic poles.

* * * * *